(12) United States Patent
Seo et al.

(10) Patent No.: US 8,745,668 B2
(45) Date of Patent: Jun. 3, 2014

(54) SERVICE SYSTEM AND METHOD OF PROVIDING SERVICE IN DIGITAL RECEIVER THEREOF

(75) Inventors: Chuhyun Seo, Pyeongtaek-si (KR); Yongki Lee, Pyeongtaek-si (KR); Taejin Park, Pyeongtaek-si (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 13/466,733

(22) Filed: May 8, 2012

(65) Prior Publication Data

US 2012/0291071 A1 Nov. 15, 2012

(30) Foreign Application Priority Data

May 9, 2011 (KR) .................. 10-2011-0043398
Oct. 31, 2011 (KR) .................. 10-2011-0112106

(51) Int. Cl.
*H04N 5/445* (2011.01)
*G06F 3/00* (2006.01)
*G06F 13/00* (2006.01)

(52) U.S. Cl.
USPC .................. 725/50; 725/48; 725/44

(58) Field of Classification Search
CPC ...................................... H04H 60/35
USPC .................................................. 725/41
See application file for complete search history.

(56) References Cited

U.S. PATENT DOCUMENTS

| | | | | |
|---|---|---|---|---|
| 4,884,266 A | * | 11/1989 | Pflaumer | 370/545 |
| 6,799,328 B1 | * | 9/2004 | Freimann et al. | 725/44 |
| 2003/0051246 A1 | * | 3/2003 | Wilder et al. | 725/49 |
| 2009/0133074 A1 | * | 5/2009 | White et al. | 725/50 |
| 2009/0293088 A1 | * | 11/2009 | Mukerji et al. | 725/47 |
| 2011/0072465 A1 | * | 3/2011 | Lee et al. | 725/45 |

* cited by examiner

*Primary Examiner* — Nathan Flynn
*Assistant Examiner* — William J Kim
(74) *Attorney, Agent, or Firm* — Birch, Stewart, Kolasch & Birch, LLP

(57) ABSTRACT

A digital receiver and method of controlling the same are provided. An embodiment of the method of providing service data in a digital receiver includes transmitting device information including information about a country and a receiver type to a server; receiving a group identifier, ID, in accordance with the device information from the server; transmitting a service list including the received group ID and first service data to the server at a first interval; and receiving second service data from the server, configuring a service guide, and providing the service guide.

15 Claims, 22 Drawing Sheets

|   | ch | Time | Title | Resolution | Note |
|---|---|---|---|---|---|
| 1 | Ch 002 BBB | 20:00-21:00 | Secret garden episode #12 | HD | Terrestrial, Current |
| 2 | Ch 024 CCC | 23:00-24:00 | Secret garden episode #12 | SD | Cable, Retransmission |
| 3 | Ch 068 DDD | 20:00-21:00 | Secret garden episode #12 | SD | Cable thumbnail and synopsis included |

| | Receive Type | ch/URL | Time | Title | Resolution | Note |
|---|---|---|---|---|---|---|
| 1 | DVB-T | Ch 002 BBB | 20:00-21:00 | Secret garden episode #12 | HD | current |
| 2 | DVB-C | Ch 024 CCC | 23:00-24:00 | Secret garden episode #12 | SD | retransmission |
| 3 | CP-1 | url-1 | --:-- | Secret garden episode #12 | SD | Thumbnail included (url-3) |
| 4 | CP-2 | url-2 | --:-- | Secret garden episode #12 | HD | Thumbnail and synopsis included (url-4) |

FIG. 20

| 3-id (Region/Mux/Service) | dcb://233a.2f.1 |
|---|---|
| Service name | BBC1 |
| Final reception time | 2011-5-11 09:25:20(GMT) |
| NUTCR : Next upload time if connection is refused | 10 seconds |
| Image Data | JPG file data (in memory) |

SERVICE SYSTEM AND METHOD OF PROVIDING SERVICE IN DIGITAL RECEIVER THEREOF

This application claims the benefit of the Korean Patent Application No. 10-2011-0043398, filed on May 9, 2011, and No. 10-2011-0112106, filed on Oct. 31, 2011, which are hereby incorporated by reference as if fully set forth herein.

BACKGROUND OF THE INVENTION

1. Field of the Invention

The present invention relates to a service system and operation of a digital receiver, and more particularly, to a service system for providing an improved service and a method of providing a service in a digital receiver included in the service system.

2. Discussion of the Related Art

Recently, rapid changeover from analog broadcast to digital broadcast has been made.

Digital broadcast has advantages of low data loss and easy error correction due to robustness against external noise and provides distinct images owing to high resolution, as compared to conventional analog broadcast. In addition, the digital broadcast can provide a bi-directional service, distinguished from analog broadcast.

Meanwhile, there have recently been implemented IPTV broadcast services which provide real-time broadcast, CoD (Content on Demand), etc. through an IP (Internet Protocol) network linked to each home in addition to conventional terrestrial broadcast, satellite broadcast, and cable broadcast.

SUMMARY OF THE INVENTION

Accordingly, the present invention is directed to a service system and a method of providing service in digital receiver thereof that substantially obviate one or more problems due to limitations and disadvantages of the related art.

An embodiment of the present invention is to provide an improved service by widening channel or service coverage of a digital receiver and providing a service guide including abundant metadata.

Another embodiment of the present invention is to provide a service system including a server and/or a cloud server for communicating with and/or supporting the digital receiver such that the above-mentioned embodiment can be performed in the digital receiver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a method of providing service data in a digital receiver, the method may include transmitting device information including information about a country and a receiver type to a server; receiving a group identifier, ID, in accordance with the device information from the server; transmitting a service list including the received group ID and first service data to the server at a first interval; and receiving second service data from the server, configuring a service guide, and providing the service guide.

In another aspect of the present invention, a method of providing service data in a digital receiver, the method may include requesting a cloud server to approve upload of a service list including a service ID and first service data at a predetermined interval; receiving a response to the request from the cloud server; uploading the service list to the cloud server on the basis of the response; downloading second service data from the cloud server; and configuring a service guide on the basis of the downloaded second service data and providing the service guide.

In another aspect of the present invention, a service system may include a digital receiver configured to transmit device information including information about a country and a receiver type to a server, receive a group identifier, ID, based on the device information from the server, and transmit a service list including the received group ID and first service data to the server at a first interval, wherein the digital receiver receives second service data from the server, configures a service guide, and provides the service guide.

In another aspect of the present invention, a service system may include a digital receiver configured to request a cloud server having a predetermined address to approve upload of a service list including a service ID and first service data at a predetermined interval, receive a response to the request from the cloud server, and upload the service list to the cloud server on the basis of the response, wherein the digital receiver downloads second service data from the cloud server, configures a service guide on the basis of the downloaded second service data and provides the service guide.

According to embodiments of the present invention, it is possible to provide an improved service by widening the channel or service coverage of a digital receiver and providing a service guide including abundant metadata. Furthermore, it is possible to provide a service system including a server and a cloud server which communicate with and support the digital receiver. Moreover, it is possible to provide improved services through the service system and the digital receiver, thereby improving user convenience and satisfaction in using the service system and the digital receiver to induce purchase.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 20 shows a table stored in a cloud server system according to an embodiment of the present invention;

DETAILED DESCRIPTION OF THE INVENTION

Embodiments of the present invention will be described in detail with reference to the accompanying drawings.

The terms "module" and "unit or part" used to signify components are used herein to aid in understanding of the components and thus they should not be considered as having specific meanings or roles. Accordingly, the terms "module" and "unit or part" may be used interchangeably.

An example of a digital receiver, described in the specification, is an intelligent receiver including a computer support function in addition to a broadcast reception function, and can be equipped with an interface which can be conveniently used, such as a handwriting type input device, a touchscreen, a spatial remote controller, etc., since it can additionally provide the Internet function while being devoted to the broadcast reception function. Furthermore, the digital receiver can be connected to the Internet or/and a computer to perform e-mail, web browsing, banking and game services because it can support wired or wireless Internet services. The digital receiver can use a standardized general-purpose operating system (OS) in order to execute functions relating to the various above-mentioned services. In addition, the digital receiver can execute various user-friendly functions by freely adding/deleting various applications to/from a general-purpose OS kernel. Examples of the digital receiver can include a network TV receiver, a hybrid broadcast broadband TV (HBBTV) receiver, and a Smart TV receiver. Furthermore, the digital receiver can further include a personal digital assistant (PDA), a smart phone, a tablet PC, etc.

Although embodiments of the present invention will be described in detail with reference to the accompanying drawings and content of the drawings, the present invention is not limited or restricted by such embodiments.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

Figure 1:
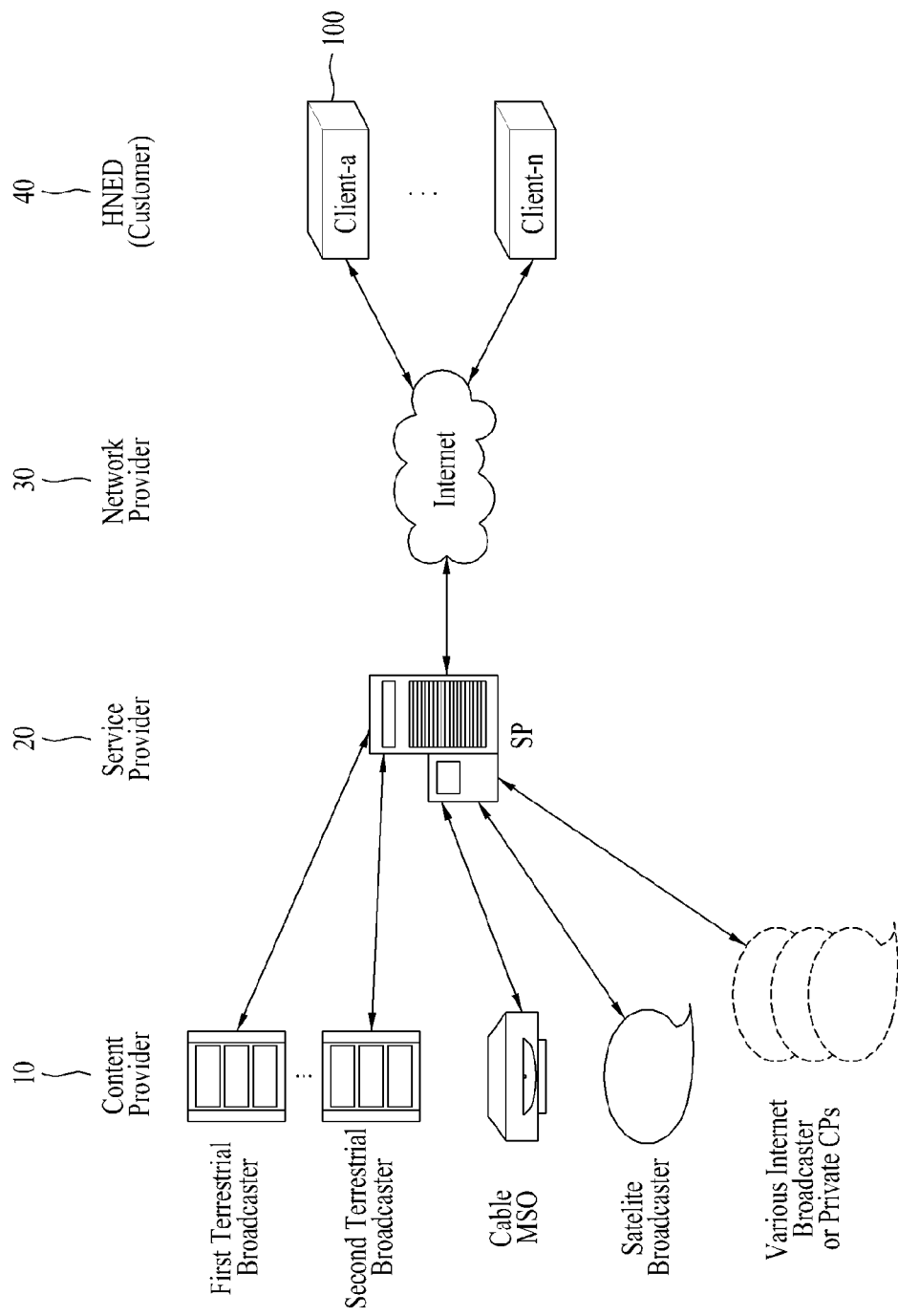
FIG. 1 illustrates an exemplary broadcast system including a digital receiver according to an embodiment of the present invention.

FIG. 1 illustrates a broadcast system including a digital receiver according to an embodiment of the present invention. Here, the broadcast system can be a service system according to the present invention.

Referring to FIG. 1, an exemplary broadcast system can include a content provider (CP) 10, a service provider (SP) 20, a network provider (NP) 30, and a home network end user (HNED) (Customer) 40. The HNED 40 can include a client 100, that is, a digital receiver.

The CP 10 can produce and provide content. Referring to FIG. 1, the CP 10 can include terrestrial broadcasters, a cable system operator (SO) or multiple system operator (MSO), a satellite broadcaster, various Internet broadcasters, private content providers (CPs), etc. The CP 10 may also provide various applications in addition to broadcast content, which will be described below.

The SP 20 can packetize content provided by the CP 10. For example, the SP 20 can packetize at least one of first terrestrial broadcast content, second terrestrial broadcast content, cable MSO content, satellite broadcast content, various Internet broadcast content, applications, etc. and provide the packetized content to a user.

The SP 20 can provide services to the client 100 according to a uni-cast or multi-cast scheme. The uni-cast scheme can be to transmit data one to one between one transmitter and one receiver. For example, when a receiver requests a server to provide data, the server can transmit the data to the receiver at the request of the receiver. On the contrary, the multi-cast scheme can transmit data to a plurality of receivers in a group. For example, a server can simultaneously transmit data to a plurality of previously registered receivers. For multi-cast registration, Internet group management protocol (IGMP) can be used.

The CP 10 and the SP 20 can be configured in the form of one entity. For example, the CP 10 can function as the SP 20 by producing content and directly packetizing the produced content into services, and vice versa.

The NP 30 can provide a network for data exchange between a server and the client 100.

The server which will be described in detail below may be one of a service provider and a Cloud server which will be described later may be one of service providers or network providers.

The client 100 can construct a home network and transmit/receive data.

The server can use a conditional access or content protection means in order to protect transmitted content. In this case, the client 100 can use a means such as a cable card (Point of Deployment (POD)) or downloadable CAS (DCAS), which corresponds to the conditional access or content protection means of the server.

In addition, the client 100 can use an interactive service through a network. In this case, the client 100 can serve as a content provider, and the service provider 20 can receive content provided by the client 100 and transmit the received content to other clients.

Figure 2:
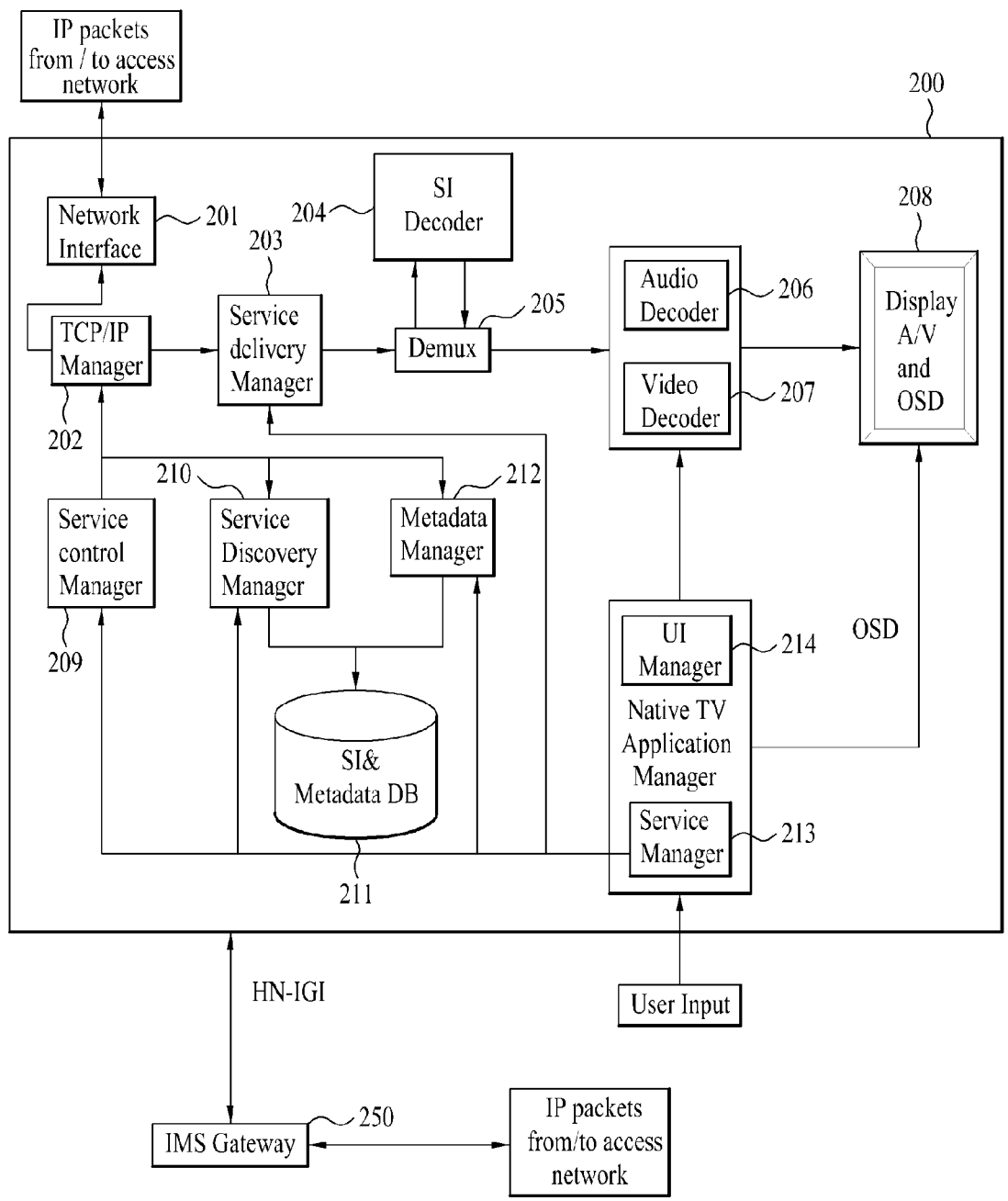
FIG. 2 illustrates a digital receiver according to an embodiment of the present invention.

FIG. 2 is a schematic diagram of a digital receiver according to an embodiment of the present invention. In FIG. 2, a digital receiver 200 may correspond to the client 100 shown in FIG. 1.

The digital receiver 200 can include a network interface 201, a TCP/IP manager 202, a service delivery manager 203, an SI (any one of system information, service information and signaling information) decoder 204, a demultiplexer 205, an audio decoder 206, a video decoder 207, a display A/V (Audio/Video) and OSD (On Screen Display) module 208, a service control manager 209, a service discovery manager 210, a SI & metadata database (DB) 211, a metadata manager 212, a service manager 213, a UI manager 214, etc.

The network interface 201 receives or transmits IP (Internet Protocol) packets through a network. In other words, the network interface 201 can receive a service, content, etc. from the SP 20 shown in FIG. 1 through a network.

The TCP/IP manager 202 can involve in delivery of IP packets transmitted to the digital receiver 200 and IP packets transmitted from the digital receiver 200, that is, packet delivery between a source and a destination. The TCP/IP manager 202 can classify received packets according to an appropriate protocol and output the classified packets to at least one of the service delivery manager 205, the service discovery manager 210, the service control manager 209, and the metadata manager 212.

The service delivery manager 203 can control received service data. For example, the service delivery manager 203 can control real-time streaming data using real-time protocol/real-time control protocol (RTP/RTCP). When the service delivery manager 203 transmits the real-time streaming data using the RTP, the service delivery manager 203 may parse the received data packet according to the RTP and transmit the parsed data packet to the demultiplexer 205, or store the parsed data packet in the SI & metadata DB 211 under control of the service manager 213. The service delivery manager 203 can do feedback network reception information to the service providing server using the RTCP.

The demultiplexer 205 demultiplexes the received packet into audio data, video data, and SI data and respectively transmits the audio data, video data, and SI data to the audio decoder 206, the video decoder 207 and the SI decoder 204.

The SI decoder 204 can decode SI data. Herein, for example, the SI data may be at least one of a program specific information (PSI), a program and system information protocol (PSIP), and a digital video broadcast-service information (DVB-SI).

The SI decoder 204 can store the decoded service information in the SI & metadata DB 211, for example. The service information stored in the SI & metadata DB 211 can be read by a corresponding component and used at the request of the user. Here, SI regarding an EPG (Electronic Program or Service Guide) service or a channel browsing service at the request of the user can also be read from the SI & metadata DB 211. This will be described below in detail.

The audio decoder 206 and the video decoder 207 can respectively decode the audio data and video data, which are demultiplexed by the demultiplexer 205. The decoded audio data and video data are provided to the user through the display unit 208.

The service manager 213 and the UI manager 214 may be included in an application manager. The application manager may administrate the overall state of the digital receiver 200, provide a UI, and manage other mangers.

The UI manager 214 can provide a graphical user interface (GUI) to the user using OSD, receive a key input from the user, and perform a receiver operation corresponding to the key input. For example, upon reception of a key input relating to channel selection from the user, the UI manager 214 can transmit the key input signal to the service manager 213.

The service manager 213 can control at least one service-related managers such as the service delivery manager 203, the service discovery manager 210, the service control manager 209, and the metadata manager 212.

The service manager 213 can configure a channel map and select a channel using the channel map according to a key input received from the UI manager 214. The service manager 213 can receive channel service information from the SI decoder 204 and set audio/video packet identifiers (PIDs) of the selected channel to the demultiplexer 205. This PIDs to the demultiplexer 205 is used for the above-mentioned demultiplexing process. The demultiplexer 205 can filter audio data, video data and SI data based on the PID.

The service discovery manager 210 can provide information required to select a service provider that provides a service. Upon receipt of a signal for selecting a channel from the service manager 213, the service discovery manager 210 can discover a service on the basis of the received signal.

The service control manager 209 can select and control a service. For example, the service control manager 209 can perform service selection and control using IGMP or RTSP when the user selects a live broadcast service and using RTSP when the user selects a video on demand (VOD) service. The RTSP can provide a trick mode for real-time streaming. The service control manager 209 can initiate and manage a session established through an IMS (IP multimedia subsystem) gateway 250 using an IMS and a session initiation protocol (SIP). The above-mentioned protocols are exemplary and other protocols can be used according to implementation.

The metadata manager 212 can manage metadata regarding services and store the metadata in the SI & metadata DB 211.

The SI & metadata database 211 can store service information decoded by the SI decoder 204, metadata managed by the metadata manager 212, and information required to select a service provider, which is provided by the service discovery manager 210. In addition, the SI & metadata DB 211 can store system setup data.

The SI & metadata database 211 can be implemented as a non-volatile RAM (NVRAM), a flash memory or the like.

The IMS gateway 250 can include functions required to access an IPTV service on the basis of an IMS.

Figure 3:
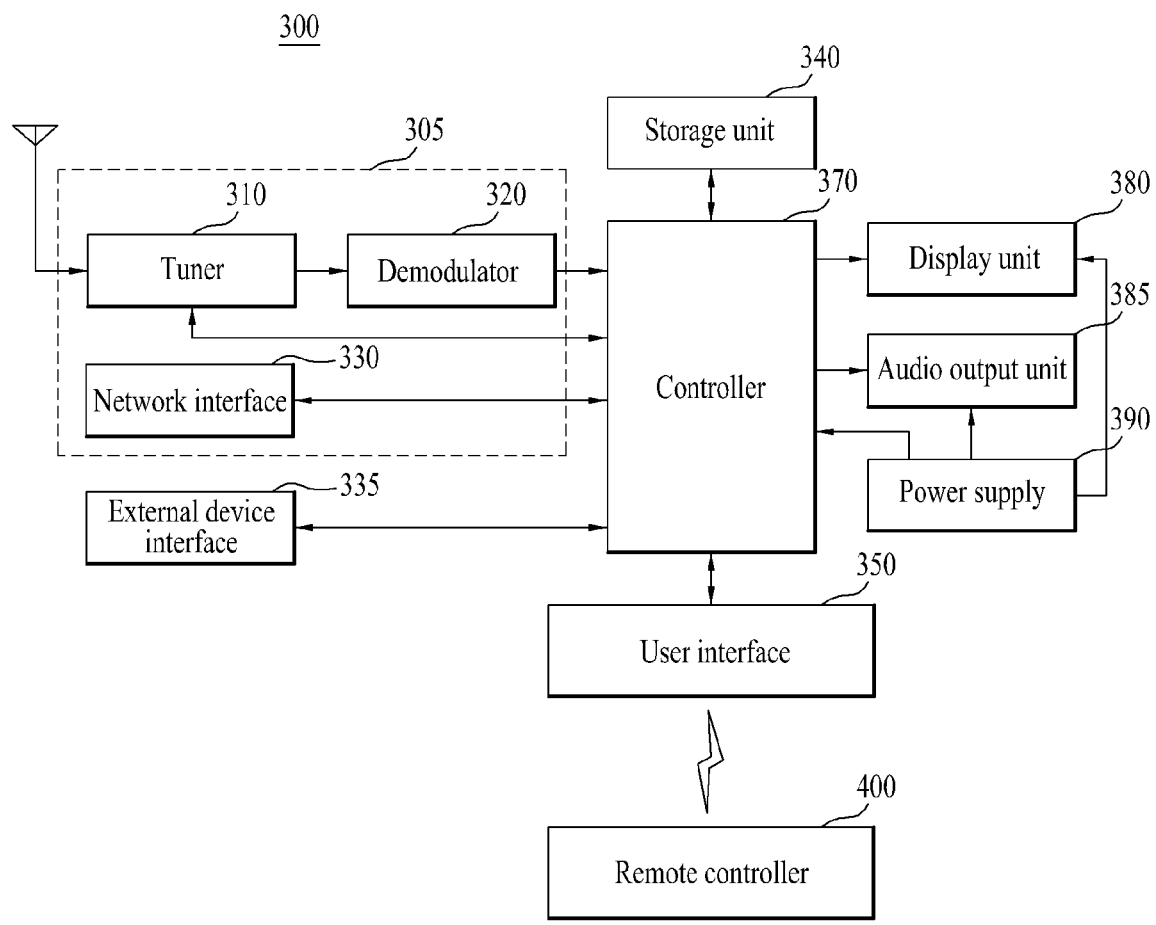
FIG. 3 illustrates a digital receiver according to another embodiment of the present invention.

FIG. 3 illustrates a digital receiver according to another embodiment of the present invention.

Referring to FIG. 3, a digital receiver 300 may include a broadcast receiving unit 305, an external device interface 335, a storage unit 340, a user input interface 350, a controller 370, a display unit 380, an audio output unit 385, a power supply unit 390, and a photographing unit (not shown). The broadcast receiving unit 305 may include at least one of one or more tuner 310, a demodulator 320, and a network interface 330. The broadcast receiving unit 305 may include the tuner 310 and the demodulator 320 without the network interface 330, or may include the network interface 330 without the tuner 310 and the demodulator 320. The broadcast receiving unit 305 may include a multiplexer (not shown) to multiplex a signal, which is subjected to the tuner 310 and demodulated by the demodulator 320, and a signal received through the network interface 330. In addition, the broadcast receiving unit 305 can include a demultiplexer (not shown) to demultiplex the multiplexed signal, the demodulated signal or the signal received through the network interface 330.

The tuner 310 can receive a radio frequency (RF) signal by tuning to a channel selected by the user from among RF signals received through an antenna or all previously stored channels. The tuner 310 can convert the received RF signal into an intermediate frequency (IF) signal or a baseband signal.

For example, when the received RF signal is a digital broadcast signal, the tuner 310 can convert the RF signal into a digital IF signal (DIF). When the received RF signal is an analog broadcast signal, the tuner 310 can convert the RF signal into an analog baseband video or audio signal (CVBS/SIF). That is, the tuner 310 can process both a digital broadcast signal and an analog broadcast signal. The CVBS/SIF output from the tuner 310 can be directly input to the controller 370.

In addition, the tuner 310 can receive a single-carrier RF signal according to the advanced television system committee (ATSC) scheme or a multi-carrier RF broadcast signal according to digital video broadcasting (DVB) scheme.

The tuner 310 can sequentially tune to and receive RF signals of all broadcast channels, which are stored through a channel memory function, from among RF signals received through the antenna and convert the received signals into intermediate frequency signals or baseband signals.

The demodulator 320 can receive and demodulate the DIF converted by the tuner 310.

For example, when the DIF signal output from the tuner 310 is an ATSC signal, the demodulator 320 can perform 8-vestigal side band (8-VSB) demodulation. Furthermore, the demodulator 320 can also perform channel decoding. To execute channel decoding, the demodulator 320 may include at least one of a trellis decoder, a deinterleaver and a Reed-Solomon (RS) decoder to perform at least one of trellis decoding, deinterleaving and RS decoding.

For example, when the DIF signal output from the tuner 310 is a DVB signal, the demodulator 320 can perform coded orthogonal frequency division access (COFDMA) modulation. Furthermore, the demodulator 320 can also carry out channel decoding. To achieve this, the demodulator 320 may include at least one of a convolution decoder, a deinterleaver, and a RS decoder to perform at least one of convolution decoding, deinterleaving and RS decoding.

The demodulator 320 can output a transport stream (TS) after performing demodulation and channel decoding. The stream signal may be a signal obtained by multiplexing a video signal, an audio signal, or a data signal. For example, the stream signal can be an MPEG-2 (Moving Picture Experts Group-2) TS obtained by multiplexing an MPEG-2 video signal and a Dolby AC-3 audio signal. The MPEG-2 TS may include a 4-byte header and a 184-byte payload.

The demodulator 320 can be implemented for each of the ATSC scheme and DVB scheme. That is, the digital receiver 300 can include at least one of an ATSC demodulator and a DVB demodulator.

The stream signal output from the demodulator 320 can be applied to the controller 370. The controller 370 can control demultiplexing, video/audio signal processing, etc. Furthermore, the controller 370 can control image output through the display unit 380 and audio output through the audio output unit 385.

The external device interface 335 can provide an environment for interfacing external devices with the digital receiver 300. To implement this, the external device interface 335 may include an A/V input/output unit (not shown) or an RF communication unit (not shown).

The external device interface 335 can be connected with external devices such as a Smart Phone, a tablet PC, an IP or Cloud server, a digital TV, a STB (Set-top box), a digital versatile disc (DVD) player, a Blu-ray player, a game console, a camera, a camcorder, a computer (including a notebook computer), etc. in a wired/wireless manner. The external device interface 335 can transmits a video signal, an audio signal or a data signal, input through an external device connected thereto, to the controller 370 of the digital receiver 300. The external device interface 335 can control a video signal, audio signal or data signal processed by the controller 370 to be output to an external device connected thereto. To achieve this, the external device interface 335 may further include an A/V input/output unit (not shown) or an RF communication unit (not shown).

The A/V input/output unit (not shown) may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc. and input a video signal and an audio signal of an external device to the digital receiver 300 through the terminals.

The RF communication unit (not shown) can perform near field communication with other electronic devices. The digital receiver 300 can be connected or networked with other electronic devices according to communication protocols such as Bluetooth, radio frequency identification (RFID), infrared data association (IrDA), ultra wideband (UWB), Zig-Bee, digital living network alliance (DLNA), etc., for example.

The external device interface 335 can be connected with a STB through at least one of the aforementioned terminals to transmit/receive data to/from the STB.

The external device interface 335 can receive an application or an application list included in a neighboring external device, and deliver the received application or application list to the controller 370 or the storage unit 340.

The network interface 330 can provide an interface for connecting the digital receiver 300 to wired/wireless networks including the Internet. The network interface 330 can include an Ethernet terminal through which the network interface 300 is connected with a wired network and use communication protocols such as wireless LAN (WLAN) (Wi-Fi), wireless broadband (WiBro), world interoperability for microwave access (WiMax), high speed downlink packet access (HSDPA), LTE (Long Term Evolution), etc. to be linked with a wireless network.

The network interface 330 can transmit/receive data to/from other users or other electronic apparatuses through a network connected thereto or another network linked to the connected network. Particularly, some content data stored in the digital receiver 300 can be transmitted to a user or an electronic apparatus, which is selected from users or electronic apparatuses previously registered in the digital receiver, through the network interface 330.

The network interface 330 can access a predetermined web page through a network connected thereto or another network linked to the connected network. Specifically, the network interface 330 can access a predetermined web page through a network and transmit/receive data to/from a corresponding server. In addition, the network interface 330 can receive content or data provided by a CP or a NP. Specifically, the network interface 330 can receive content such as a movie, an advertisement, a game, a VOD, and broadcast signals and related information, provided by the CP or NP, through a network. Furthermore, the network interface 330 can receive update information and update files of firmware provided by the NP. Moreover, the network interface 330 can transmit data to the Internet, the CP or the NP.

The network interface 330 can selectively receive a desired application from among public applications through a network.

The network interfaces 201 and 330 shown in FIGS. 2 and 3 can transmit/receive service data to/from the server or cloud server which will be described below.

The storage unit 340 may store programs for signal processing and control in the controller 370 and store a processed video, audio or data signal.

In addition, the storage unit 340 may execute a function of temporarily storing a video, audio or data signal input from the external device interface 335 or the network interface 330. The storage unit 340 may store information about a predetermined broadcast channel through a channel memory function.

The storage unit 340 can store an application or an application list input from the external device interface 335 or the network interface 330.

The storage unit 340 may store various platforms which will be described later.

The storage unit 340 can include storage media of one or more types, such as a flash memory type, a hard disc type, a multimedia card micro type, a card type memory (e.g. SD or XD memory), RAM, EEPROM, etc. The digital receiver 300 may reproduce content files (a video file, a still image file, a music file, a text file, an application file, etc.) and provide them to the user.

While FIG. 3 illustrates an embodiment in which the storage unit 340 is separated from the controller 370, the configuration of the digital receiver 300 can be not limited thereto and the storage unit 340 may be included in the controller 370.

The user input interface 350 can transmit a signal input by the user to the controller 370 or deliver a signal output from the controller 370 to the user.

For example, the user input interface 350 can receive and process control signals such as a power on/off signal, a channel selection signal, an image setting signal, etc. from the remote controller 400 or transmit control signals of the controller 370 to the remote controller 400 according to various communication schemes such as RF communication, IR communication, etc.

The user input interface 350 can transmit control signals input through a power key, a channel key, a volume key, and a local key (not shown) of a set value to the controller 370.

The user input interface 350 can transmit a control signal input from a sensing unit (not shown) which senses a gesture of the user or deliver a signal of the controller 370 to the sensing unit (not shown). Here, the sensing unit (not shown) may include a touch sensor, an audio sensor, a position sensor, a motion sensor, an acceleration sensor, a gyro sensor, etc.

The controller 370 can generate and output a signal for video or audio output by demultiplexing streams input through the tuner 310, the demodulator 320 or the external device interface 335 or processing demultiplexed signals.

A video signal processed by the controller 370 can be input to the display unit 380 and displayed as an image through the display unit 380. In addition, the video signal processed by the controller 370 can be input to an external output device through the external device interface 335.

An audio signal processed by the controller 370 can be applied to the audio output unit 385. Otherwise, the audio signal processed by the controller 370 can be applied to an external output device through the external device interface 335.

The controller 370 may include a demultiplexer and an image processor, etc. which are not shown in FIG. 3.

The controller 370 can control the overall operation of the digital receiver 300. For example, the controller 370 can control the tuner 310 to tune to an RF corresponding to a channel selected by the user or a previously stored channel.

The controller 370 can control the digital receiver 300 according to a user command input through the user input interface 350 or an internal program. Particularly, the controller 370 can control the digital receiver 300 to be linked to a network to download an application or an application list that the user desires.

For example, the controller 370 can control the tuner 310 to receive a signal of a channel selected in response to a predetermined channel selection command received through the user input interface 350. In addition, the controller 370 can process a video, audio or data signal corresponding to the selected channel. The controller 370 can control information on a channel selected by the user to be output along with a processed video or audio signal through the display unit 380 or the audio output unit 385.

Alternatively, the controller 370 can control a video signal or an audio signal received from an external apparatus, for example, a camera or a camcorder through the external device interface 335 to be output through the display unit 380 or the audio output unit 385 according to an external device image reproduction command received through the user input interface 350.

The controller 370 can control the display unit 380 to display images. For example, the controller 370 can control a broadcast image input through the tuner 310, an external input image received through the external device interface 335, an image input through the network interface 330, or an image stored in the storage unit 340 to be displayed on the display unit 380. Here, an image displayed on the display unit 380 can be a still image or video, and it can be a 2D (2-Dimensional) or 3D (3-Dimensional) image.

The controller 370 can control reproduction of content. Here, the content may be content stored in the digital receiver 300, received broadcast content, or content input from an external device. The content may include at least one of a broadcast image, an external input image, an audio file, a still image, an image of a linked web page, and a text file.

The controller 370 can control display of an application or an application list, which is downloadable from the digital receiver 300 or an external network, when an application view menu is selected.

The controller 370 can control installation and execution of applications downloaded from an external network in addition to various user interfaces. Furthermore, the controller 370 can control an image relating to an application executed by user selection to be displayed on the display unit 380.

The digital receiver 300 may further include a channel browsing processor (not shown) which generates a thumbnail image corresponding to a channel signal or an external input signal.

The channel browsing processor (not shown) can receive a TS signal output from the demodulator 320 or a stream signal output from the external device interface 335 and extract an image from the received stream signal to generate a thumbnail image. The generated thumbnail image can be directly input to the controller 170 or can be encoded and then input to the controller 170. Also, the thumbnail image can be encoded into a stream and then applied to the controller 370. The controller 370 can display a thumbnail list including a plurality of thumbnail images on the display unit 380 using thumbnail images input thereto. The thumbnail images included in the thumbnail list can be updated sequentially or simultaneously. Accordingly, the user can conveniently check content of a plurality of broadcast channels.

The display unit 380 can convert a video signal, a data signal, and an OSD signal processed by the controller 370, or a video signal and a data signal received from the external device interface 335 into RGB signals to generate driving signals.

The display unit 380 may be a CRT (Cathode-Ray Tube), a PDP (Plasma Display Panel), an LCD (Liquid Crystal Display), an LED (Light Emitting Diode), an OLED (Organic Light Emitting Diode), a flexible display, a 3D display or the like.

The display unit 380 may be configured as a touchscreen and used as an input device rather than an output device.

The audio output unit 385 can receive a signal audio-processed by the controller 170, for example, a stereo signal, a 3.1 channel signal or a 5.1 channel signal, and output the received signal as audio. The audio output unit 385 can be implemented as one of various speakers.

The digital receiver 300 may further include the sensing unit (not shown) for sensing a user gesture or eyes (or eye contact), which includes at least one of a sensor, as described above. A signal sensed by the sensing unit (not shown) can be delivered to the controller 370 through the user input interface 350.

The digital receiver 300 may further include the photographing unit (not shown) for photographing the user. Image information acquired by the photographing unit (not shown) can be supplied to the controller 370.

The controller 370 may sense a user gesture from an image captured by the photographing unit (not shown) or a signal sensed by the sensing unit (not shown), or by combining the image and the signal.

The power supply unit 390 can supply power to the digital receiver 300.

Particularly, the power supply unit 390 can supply power to the controller 370 which can be implemented as a system-on-chip (SOC), the display unit 380 for displaying images, and the audio output unit 385 for audio output.

To achieve this, the power supply unit 390 can include a converter (not shown) for converting AC (Alternative Current) to DC (Direct Current). For example, when the display unit 380 is implemented as a LCD panel including a plurality of backlight lamps, the power supply unit 390 may further include an inverter (not shown) which can perform PWM (Pulse Width Modulation) for luminance change or dimming.

The remote controller 400 can transmit user input to the user input interface 350. To perform this, the remote controller 400 can use Bluetooth, RF communication, IR communication, ultra wideband (UWB), ZigBee, etc.

In addition, the remote controller 400 can receive audio, video or data signal output from the user input interface 350 and display the received signal or output the same as audio or vibration.

The digital receiver 300 may be a fixed or portable digital broadcast receiver capable of processing an ATSC or DVB digital broadcast signal.

The digital receivers shown in FIGS. 2 and 3 can be exemplary and components thereof can be integrated, added or omitted according to specifications thereof. That is, two or more components can be integrated into one component or one component can be subdivided into two or more components as required. The function executed by each component can be exemplified to describe embodiments of the present invention and detailed operations or devices do not limit the scope of the present invention.

In addition, some of the components shown in FIG. 2 may be omitted or a component (not shown in FIG. 2) may be added as required. The digital receiver according to the present invention may not include the tuner and the demodulator, differently from the digital receivers shown in FIGS. 2 and 3, and may receive content through the network interface or the external device interface and reproduce the content.

The digital receiver can be an example of an image signal processor which processes an image stored therein or an input image. Other examples of the image signal processors may include a STB which does not include the display unit 380 and the audio output unit 385 shown in FIG. 3, a DVD player, a Blu-ray player, a game console, a computer, etc. Among these, the set-top box will be described with reference to FIGS. 4 and 5.

Figure 4:
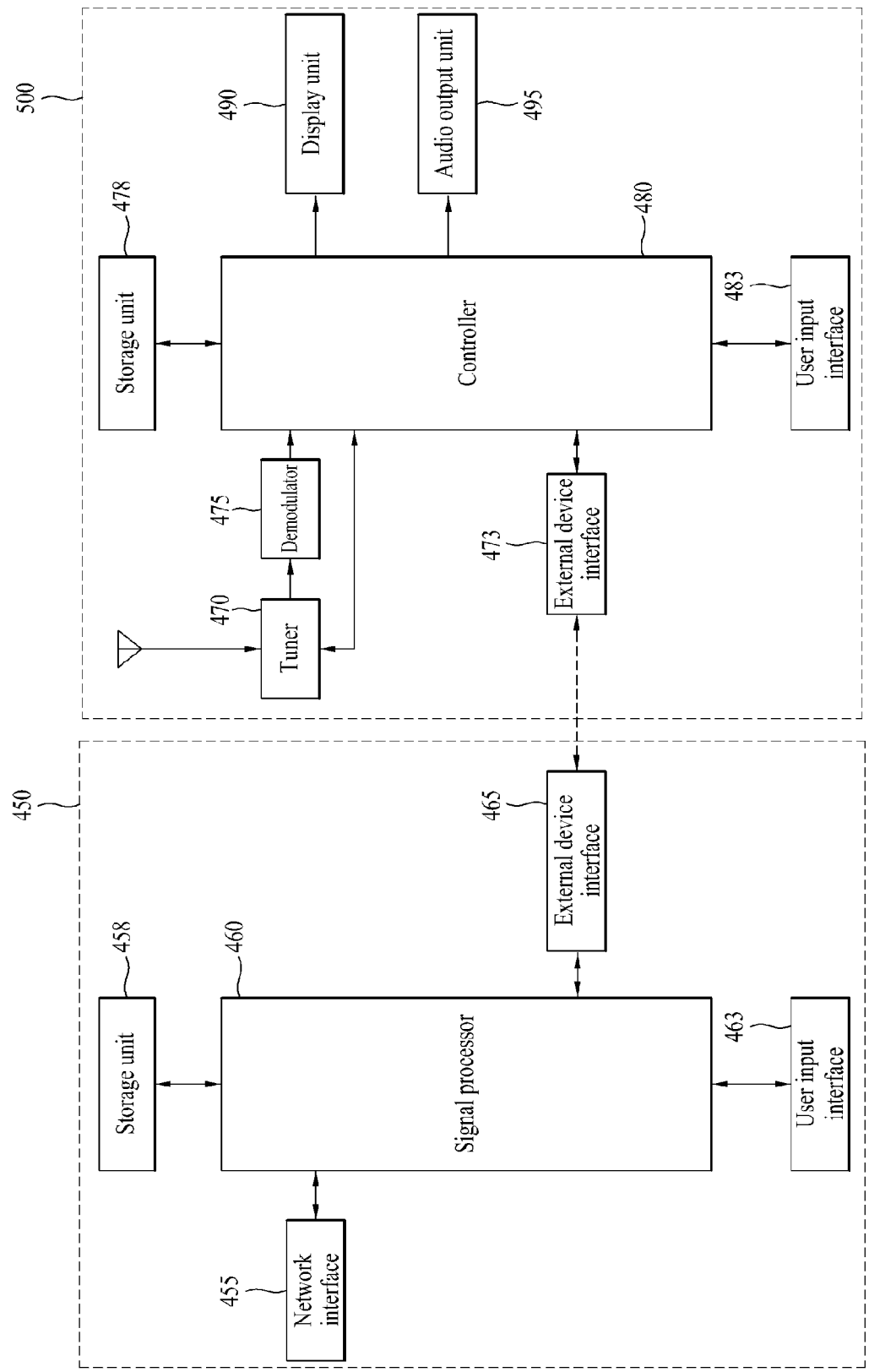
FIGS. 4 and 5 are block diagrams of a digital receiver according to another embodiment of the present invention.
Figure 5:
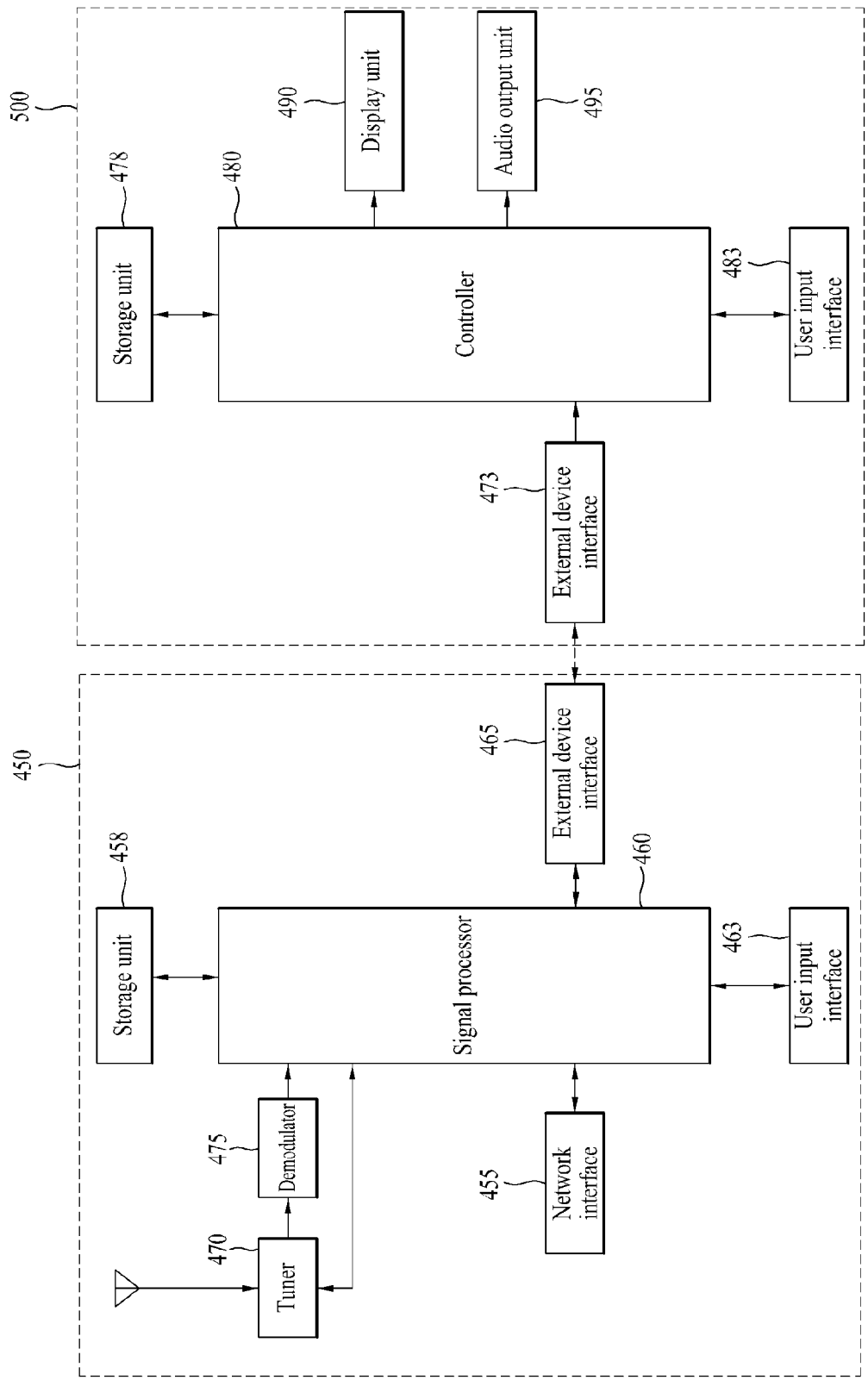

FIGS. 4 and 5 are block diagrams for illustrating detailed configurations of digital receivers according to the present invention.

Referring to FIG. 4, a STB 450 and a display device 500 may transmit/receive data to/from each other in a wired or wireless manner.

The set-top box 450 may include a network interface 455, a storage unit 458, a signal processor 460, a user input interface 463, and an external device interface 465.

The network interface 455 can provide an interface for connection with a wired/wireless network including the Internet. The network interface 455 can enable data transmission/reception to/from other users or other devices through a connected network or another network linked to the connected network.

The storage unit 458 may store data for signal processing and control in the signal processor 460. The storage unit 458 may temporarily store a video, audio or data signal input from the external device interface 465 or the network interface 455.

The signal processor 460 can process an input signal. For example, the signal processor 460 can demultiplex or decode a video signal and an audio signal input thereto. To achieve this, the signal processor 460 can include a video decoder and/or an audio decoder. The signal processor 460 can transmit a processed video signal and/or a processed audio signal to the display device 500 through the external device interface 465.

The user input interface 463 can transmit a signal input by the user to the signal processor 460 or deliver a signal output from the signal processor 460 to the user. For example, the user input interface 463 can receive various control signals including a power on/off signal, operation input, a setting input, etc., which are input through a local key (not shown) or the remote controller 400, and transmit the received control signals to the signal processor 460.

The external device interface 465 can provide an interface for transmitting/receiving data to/from an external device connected thereto in a wired or wireless manner. Particularly, the external device interface 465 can provide an interface for transmitting/receiving data to/from the display device 500. The external device interface 465 may provide an interface for transmitting/receiving data to/from an external device such as a game console, a camera, a camcorder, a computer (including a notebook computer) or the like.

The STB 450 may further include a media input unit (not shown) for media playback. A Blu-ray player (not shown) may be exemplified as the media input unit. That is, the STB 450 can include a Blu-ray player. Data of media such as a Blu-ray disc, input to the STB 450, can be transmitted to the display device 500 through the external device interface 465 to be displayed as an image after being subjected to signal processing such as demultiplexing or decoding by the signal processor 460.

The display device 500 may include a tuner 470, an external device interface 473, a demodulator 475, a storage unit 478, a controller 480, a user input interface 483, a display unit 490, and an audio output unit 495. As an example, the display device 500 may be a digital receiver of any one of FIGS. 2 and 3.

The tuner 470, the demodulator 475, the storage unit 478, the controller 480, the user input interface 483, the display unit 490, and the audio output unit 495 can respectively correspond to the tuner 310, the demodulator 320, the storage unit 340, the controller 370, the user input interface 350, the display unit 380, and the audio output unit 385 shown in FIG. 3, and thus a detailed description thereof is omitted.

The external device interface 473 can provide an interface for transmitting/receiving data to/from an external device connected thereto in a wired or wireless manner. Particularly, the external device interface 473 can provide an interface for transmitting/receiving data to/from the STB 450.

Accordingly, a video signal or an audio signal input from the set-top box 450 may be output through the display unit 480 or the audio output unit 485 via the controller 470.

Referring to FIG. 5, while the STB 450 and the display device 500 can respectively correspond to the STB 450 and the display device 500 shown in FIG. 4, the STB 450 can include the tuner 470 and the demodulator 475. Description can be focused on a difference between the configurations of FIGS. 4 and 5 below.

The signal processor 460 can process a broadcast signal received through the tuner 470 and the demodulator 475. The user input interface 463 can receive input signals relating to channel selection, channel storage, etc.

Figure 6:
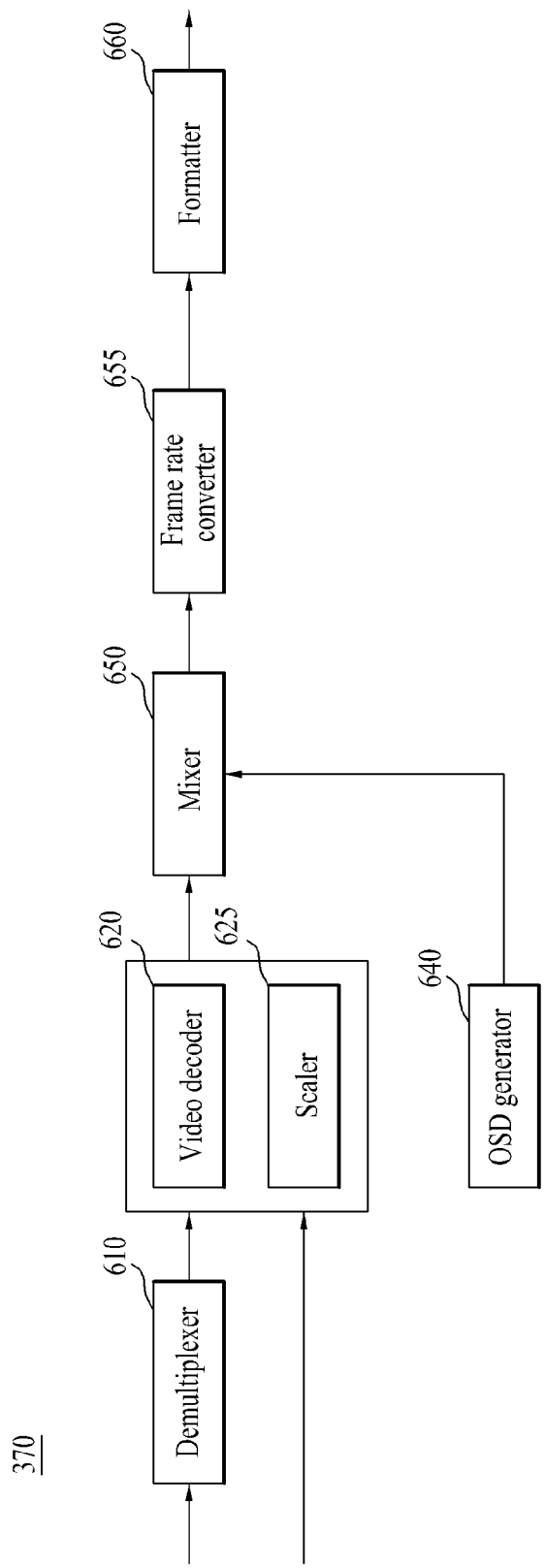
FIG. 6 is a block diagram illustrating internal components of a controller shown in FIG. 3.

FIG. 6 is a block diagram illustrating internal components of the controller shown in FIG. 3.

Referring to FIG. 6, an example of the controller 370 may include a demultipelxer 610, a video processor 620, an OSD generator 640, a mixer 650, a frame rate converter (FRC) 655, and a formatter 660. The controller 670 may further include an audio processor (not shown) and a data processor (not shown).

The demultiplexer 610 can demultiplex an input stream. For example, the demultiplexer 610 can demultiplex an input MPEG-2 TS into an image, an A/V signal and a data signal. The stream signal input to the demultiplexer 610 may be a stream signal output from the tuner 310, the demodulator 320 or the external device interface 335.

The video processor 620 can process the demultiplexed video signal. To achieve this, the video processor 620 can include a video decoder 625 and a scaler 635.

The video decoder 625 can decode the demultiplexed video signal and the scaler 635 can scale the decoded video signal such that the video signal can be displayed through the display unit 380.

The video decoder 625 can support various standards. For example, the video decoder 625 can perform a function of an MPEG-2 decoder when a video signal is encoded according to MPEG-2 scheme and execute a function of an H.264 decoder when a video signal is encoded according to a digital multimedia broadcasting (DMB) scheme or H.264.

The video signal decoded by the video processor 620 can be input to the mixer 650.

The OSD generator 640 can generate OSD data automatically or according to user input. For example, the OSD generator 640 can generate data to be displayed on the screen of the display unit 380 in the form of a graphical image or text on the basis of a control signal of the user input interface 350. OSD data generated by the OSD generator 640 can include various data such as a UI (user interface) image of the digital receiver 300, various menu screens, widgets, icons, and information on ratings.

The OSD generator 640 can generate a caption of a broadcast image or data for displaying EPG based on broadcast information.

The mixer 650 can mix the OSD data generated by the OSD generator 640 and the video signal processed by the video processor 620, and provide the mixed signal to the formatter 660. By mixing the decoded video signal and the OSD data, an OSD can be overlaid on a broadcast image or an external input image.

The frame rate converter (FRC) 655 can convert a frame rate of input video. For example, the frame rate converter 655 can convert the frame rate of input 60 Hz video to a frame rate of 120 Hz or 240 Hz, for example, according to an output frequency of the display unit 380. Various frame conversion methods can be utilized. For example, when the frame rate converter 655 converts a frame rate from 60 Hz to 120 Hz, the frame rate converter 655 can insert the same first frame between first and second frames, or insert a third frame estimated from the first and second frames. Alternatively, when the frame rate converter 655 converts a frame rate from 60 Hz to 240 Hz, the frame rate converter 655 can insert three identical frames or estimated frames between frames. The frame rate converter 655 can be bypassed when frame conversion is not performed.

The formatter 660 can change the output of the frame rate converter 655, which is input thereto, into a form suitable for the output format of the display unit 380. For example, the formatter 460 can output an RGB data signal. In this case, this RGB data signal can be output according to low voltage differential signaling (LVDS) or mini-LVDS. When a 3D image signal output from the frame rate converter 655 is input to the formatter 660, the formatter 660 can format the 3D image signal such that the 3D image signal can be matched to the output format of the display unit 380, to thereby support a 3D service through the display unit 380.

An audio processor (not shown) included in the controller 370 can audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals.

Furthermore, the audio processor (not shown) in the controller 370 can control bass, treble and volume.

In addition, a data processor (not shown) in the controller 370 can process a demultiplexed data signal. For example, when a demultiplexed data signal is encoded, the data processor (not shown) can decode the encoded demultiplexed data signal. Here, the encoded data signal may be EPG information including broadcast information such as the start time and end time of a broadcast program which is broadcast through each channel.

The controller 370 shown in FIG. 6 can be exemplary, and thus components may be added to the controller 370 or some of the components shown in FIG. 370 may be omitted as necessary.

Figure 7:
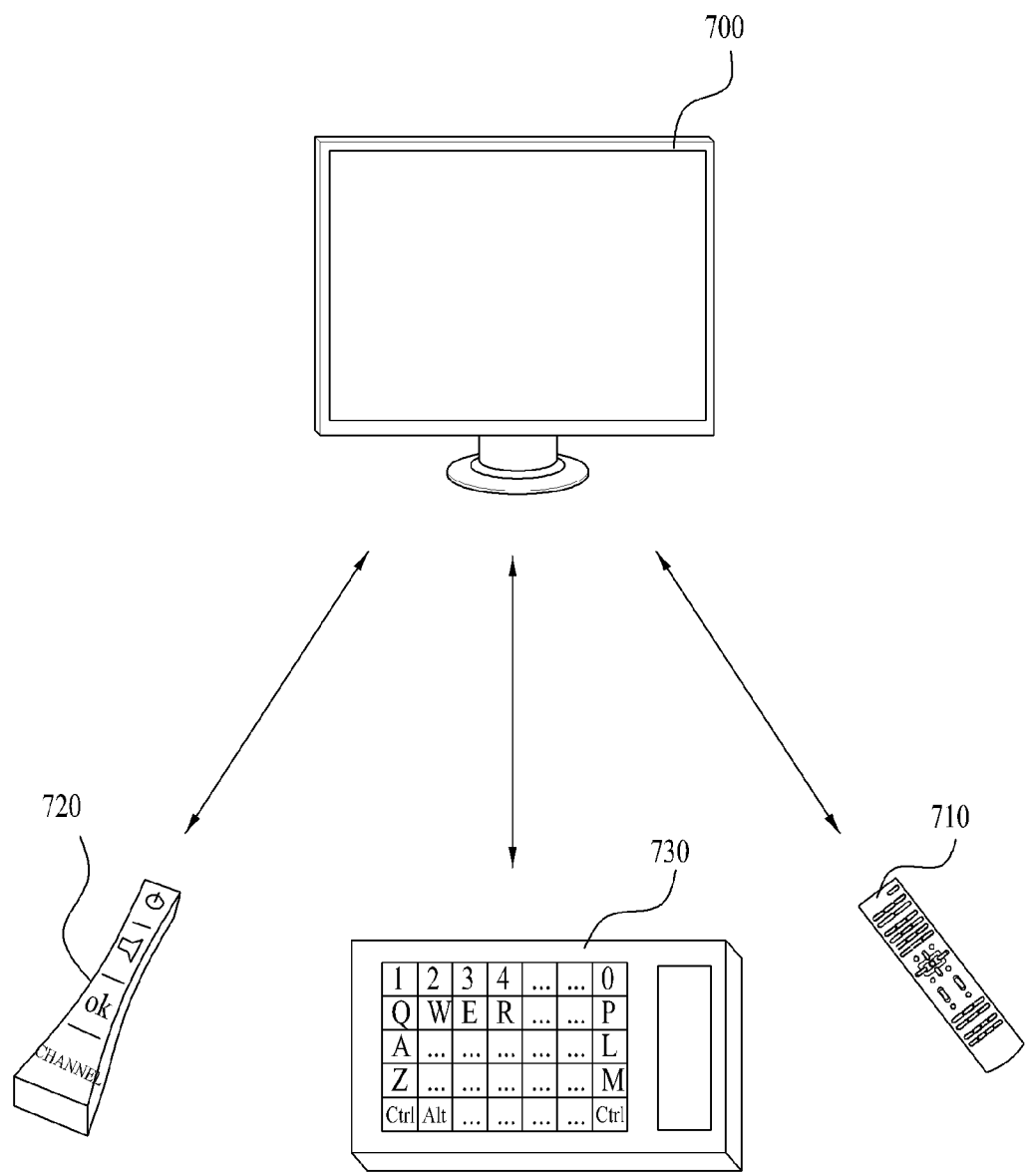
FIG. 7 illustrates remote control devices of a digital receiver according to an embodiment of the present invention.

FIG. 7 illustrates remote controllers of a digital receiver according to an embodiment of the present invention.

To execute various operations for implementing the present invention according to embodiments, various user interface devices (UIDs) which can communicate with a digital receiver 700 in a wired/wireless manner can be used as remote controllers.

The remote controllers can use various communication protocols such as Bluetooth, RFID, IrDA, UWB, ZigBee, DLNA, etc.

UIDs can include a magic remote controller 720 and a remote controller 730 equipped with a keyboard and a touch pad in addition to a general remote controller 710.

The magic remote controller 720 can include a gyro sensor mounted therein to sense vibration of a user's hand or rotation. That is, the magic remote controller 720 can move a pointer according to up, down, left and right motions of the user such that the user can easily execute a desired action, for example, easily control a channel or a menu.

The remote controller 730 including the keyboard and touch pad can facilitate text input through the keyboard and control of movement of a pointer and magnification and reduction of a picture or video through the touch pad.

To be provided with information about EPG, a thumbnail, a channel browser, and rating, the user can easily perform various operations, such as selection of a specific menu item, through the above-mentioned UIDs.

A description will be given of a method of providing an improved service with extended service coverage and abundant metadata through a digital receiver at the request of the user, as compared to conventional digital receivers, and a service system for the same. EPG, channel browser and thumbnail services will be sequentially described and then a user interface/user experience (UI/UX) by which a digital receiver can process the services and provides the processed services on a screen will be explained.

Figure 8:
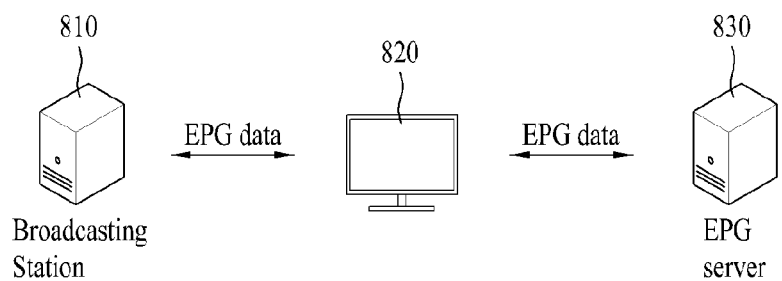
FIG. 8 illustrates an EPG service provision method.

FIG. 8 illustrates an EPG service provision method.

A digital receiver 820 can provide an EPG service according to two methods below. One method can receive data relating to an EPG as one of service information from a broadcasting station 810 and configures the EPG on the basis of the data, and the other can receive EPG data from an EPG server 830 for providing EPG information and configure an EPG based on the received EPG data. In the former case, when the digital receiver 820 tunes to a specific channel, for example, EPG data can be transmitted in the form of SI included in a digital broadcast signal received through the tuned channel. The service information can correspond to a service description table (SDT) and an event information table (EIT) in a DVB system and to PSI/PSIP information, for example, a virtual channel table (VCT) and EIT in an ATSC system. The digital receiver 820 can configure an EPG on the basis of data parsed from the SI and provide an EPG service. However, a satisfactory EPG service may not be provided using only SI transmitted from the broadcasting station and service quality may be limited because the digital receiver needs to tune to a corresponding channel or tunable channels are restricted. In the latter case, the external server 830 as an individual EPG service server can provide additional EPG data which is discriminated from SI transmitted from the broadcasting station 810 or which is not provided by the broadcasting station 810, or various EPG services with respect to prime time or prime programs. However, these EPG services can require an individual contract and fundamental EPG data are provided as subscription-based services in many cases.

As described above, the digital receiver 820 may receive EPG service data provided by the broadcasting station 810 or the EPG server 830 and provide the EPG service data to the user, or receive EPG data from both the broadcasting station 810 and the EPG server 830 and provide the received EPG data.

Figure 9:
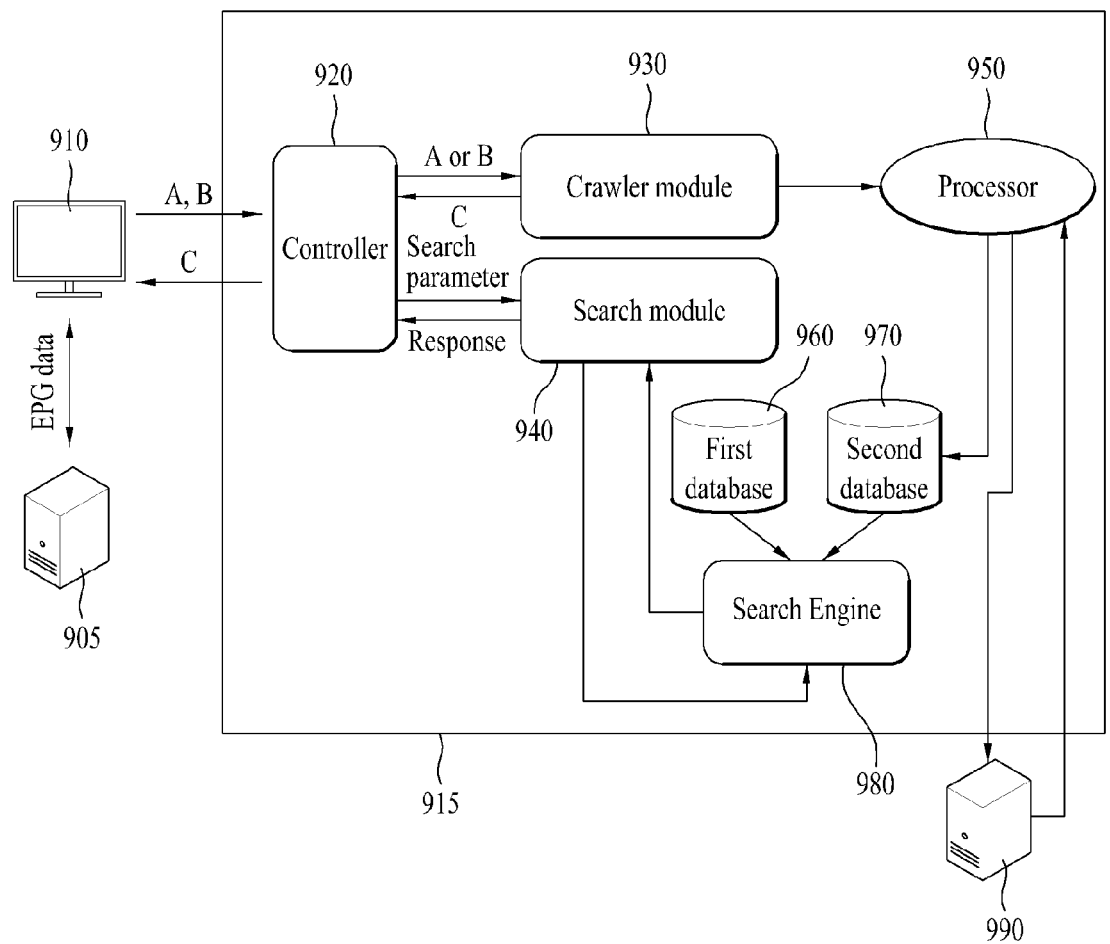
FIG. 9 illustrates a service system for providing an EPG service according to an embodiment of the present invention.

FIG. 9 illustrates a service system for providing an EPG service according to an embodiment of the present invention.

Referring to FIG. 9, the service system may include a broadcasting station 905, a digital receiver 910, and a first server 915. For example, the first server 915 can be a server provided by the manufacturer of the digital receiver 910. The service system may further include a second server 990 such as the EPG providing server 830 shown in FIG. 8.

As described above, the digital receiver 910 can receive EPG data from SI information included in a digital broadcast signal received from the broadcasting station 905 and/or from the second server 990.

However, since EPG data received from the broadcasting station 905 or EPG data provided by an EPG information provider such as the second server 990 has low channel or service coverage (e.g., approximately less than 50%), the digital receiver has difficulty providing an EPG service sufficient for an actual broadcast environment to the user. In other words, one digital receiver cannot provide a sufficient and accurate EPG service capable of satisfying a demand of the user because the service coverage of EPG data is low and metadata is insufficient even when the digital receiver acquires the EPG data according to the aforementioned method.

To solve this problem, the first server 915 can collect EPG data of digital receivers, store the collected EPG data in a database and manage the database to provide a satisfactory EPG service.

Specifically, the present invention can provide an advanced EPG service including rapidly updated information by collecting EPG data from a plurality of digital receivers having the same service list through the first server 915 and/or by transmitting EPG data processed by combining EPG data of the second server 990 to the digital receivers.

Figure 10:
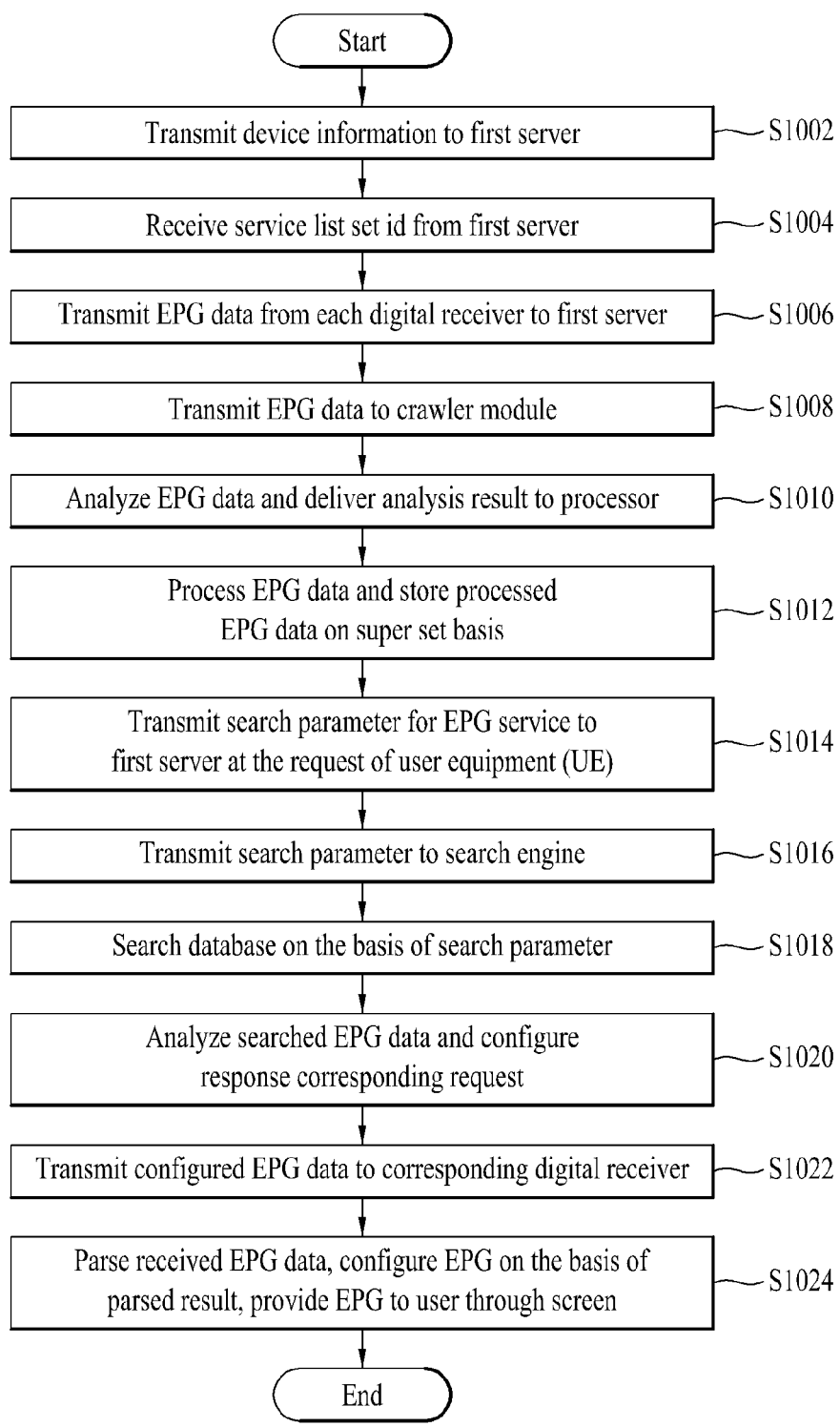
FIG. 10 is a flowchart illustrating an EPG provision method in a service system according to an embodiment of the present invention.

A method of providing an EPG service in the digital receiver 910 and a digital broadcasting system will now be described in detail with reference to FIG. 9. FIG. 10 is a flowchart illustrating an EPG provision method in the digital broadcasting system according to an embodiment of the present invention.

Referring to FIGS. 9 and 10, the digital receiver 910 can communicate with the first server 915 to perform a registration procedure in order to provide the EPG service.

For example, the digital receiver 910 can initially transmit device information to the first server 915 (A, S1002) and receive a set value according to the device information, that is, a service list set ID from the first server 915 (C, S1004).

For example, the device information can include a device country, a receiver type, and a service list. The device country may be Korea (KR), Germany (DE), or the UK. The receiver type may mean terrestrial, cable, satellite, IPTV or the like. The service list can include at least one of a list of channels or services accessible through auto-scan in a digital receiver, 3-id, and a service name, for example.

The 3-id can include an original network identifier, a transport stream identifier and a service identifier. The 3-id can be a reference group or a super set which collects, combines and processes service data received from digital receivers in the first server 915 individually or along with a service name. The first server 915 can configure a group with reference to the 3-id and/or the service name, and an identifier identifying each group corresponds to the service list set ID. In this manner, the first server 915 can classify service data received from digital receivers, group the service data, and acquire updated service data. In this case, service data of the second server 990 can also be collected and stored. For example, the group may be called a super set or include two or more super sets as sub-groups when the group needs to be classified into sub-groups on the basis of service names included in the group.

For example, the digital receiver 910 can transmit a service list including a device country of UK, a receiver type of DVB-T, and 3-id of dvb://233a.2f1 to the first server 915 as the device information. Here, '233a' may correspond to the original network identifier, '2f' may correspond to the transport stream identifier, and '1' may correspond to the service identifier.

The digital receiver 910 can include one or more of device type information such as a device model number or model name, device language information such as a language supported or used in the corresponding device, and user identification information previously registered in the first server 915 in the device information and transmit the device information including the same to the first server 915.

The first server 915 can determine which super set or group includes the digital receiver 910 on the basis of the device information transmitted from the digital receiver 910 and transmit identification information of the corresponding super set or group, that is, service list set ID to the digital receiver 910 according to the determination result.

The service list set ID can function as communication information or identification information between the digital receiver 910 and the first server 915. In other words, after the digital receiver 910 and the first server 915 identify each other through the aforementioned procedure, a service data transmission/reception procedure, for example, a procedure of the digital receiver 910 to update EPG service data to the first server 915 or to receive EPG service data from the first server can be performed using the service list set ID.

The service list set ID can be a value for identify each service list set, that is, each super set or group when the first server 915 manages EPG data for each service list. As described above, a super set or group can be configured with two from among the device information, that is, device country and receiver type. For example, in the case of Europe, services having the same 3-id for each receiver type in one country can be regarded as the same service and belong to the same super set or group.

Each digital receiver can transmit and/or update a service list including EPG service data to the first server 915 (B, S1006). The service list may include 3-id and/or a service list set ID received from the first server 915 in addition to the EPG service data. SI data received from the broadcasting station or various information which can be supported by digital receivers may be included in the EPG service data of the service list or individually transmitted. For example, information included in the service list and transmitted along with the EPG service data may include a service type (SD/HD/3D) of content, the language (Korean, English, Spanish, Germany, Chinese, Japanese, etc.) of the corresponding content, etc. Furthermore, a program title, start time, end time, duration, rating, genre, etc. may be included in the service list and transmitted and received. The service list may further include language information, video resolution, AV type information and information about present or absence of a caption, which relate to a corresponding program.

The transmitted EPG service data can be read from service information including EPG service data contained in a digital broadcast signal transmitted from the digital receiver 910. As described above, the service information containing the EPG service data can include an SDT regarding the corresponding service and an EIT regarding the corresponding event, that is, program, in the case of DVB terrestrial broadcast service, for example. In other words, the digital receiver 910 can parse an SDT and EIT from a digital broadcast signal to extract data for configuring an EPG service and store the extracted EPG service data in the storage unit. The digital receiver 910 can transmit the service list including at least one of the EPG service data, the above-mentioned 3-id and the service list set ID to the first server 915.

Figure 11:
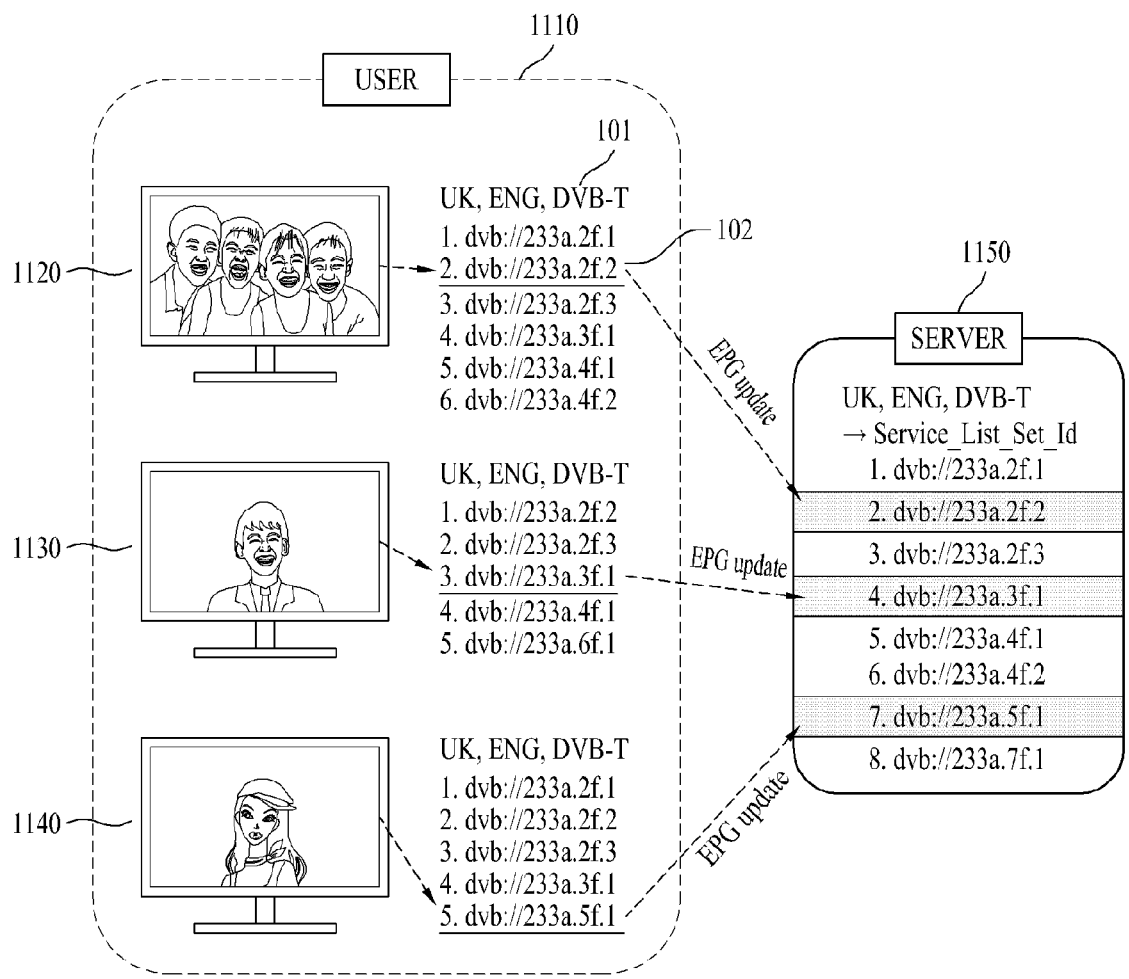
FIG. 11 illustrates an EPG data update procedure performed in a first server according to an embodiment of the present invention.

Each digital receiver can transmit EPG service data 1110 shown in FIG. 11 to the first server 915 (1150 of FIG. 11) in S1006.

The first server 915 can receive the EPG service data transmitted from each digital receiver and process the received EPG service data. The first server 915 can use EPG service data of the second server 990 to process the EPG service data received from each digital receiver. In this case, if the EPG service data received from each digital receiver and the EPG service data of the second server 990 collide, SI information, for example, can be prioritized.

A procedure of processing EPG service data in the first server 915 will now be described in detail.

Upon reception of the device information of each digital receiver in S1002, the controller 920 can transmit the device information to a crawler module 930. The crawler module 930 can configure a super set having the same service list on the basis of the device information of each digital receiver and return an ID of the configured super set, that is, a service list set ID, to the controller 920. The service list set ID may be determined by the controller 920 on the basis of the device information and directly returned.

The controller 920 can return the service list set ID returned by the crawler module 930 to the corresponding digital receiver.

Upon reception of updated EPG service data from each digital receiver after return of the service list set ID, the controller 920 can transmit the updated EPG service data to the crawler module 930 (S1008).

The crawler module 930 can transmit the EPG service data of each digital receiver, input thereto, to a processor 950 (S1010).

During this procedure, the crawler module 930 can analyze an updated parameter in the EPG service data of each digital receiver.

The crawler module 930 can process the analysis result on a service list set ID basis and transmit the processed result along with the read service list set ID to the processor 950.

Digital receivers may transmit EPG service data to the first server 915 at the same time or at different times.

For example, when the crawler module 930 determines that EPG service data received from a specific digital receiver has the same parameter as a parameter previously updated by another digital receiver or corresponds to a low version EPG service data from a result of analysis of the EPG service data, the crawler module 930 can eliminate the EPG service data instead of transmitting the EPG service data to the processor 950.

The crawler module 930 can transmit EPG service data of each digital receiver to the processor 950 whenever the EPG service data from each digital receiver is received. In this case, a load may be applied to the processor 950. To prevent this, updated parameters can be sufficiently accumulated and transmitted to the processor 950 or parameters can be periodically transmitted to the processor 950 so as to reduce server load. When the version of the received EPG service data is equal to or lower than the version of updated EPG service data, the crawler module 930 can transmit a control signal to the controller to control the transmission period of the digital receiver which transmits the corresponding EPG service data.

The processor 950 can receive the EPG service data of each digital receiver, transmitted from the crawler module 930, and store the received EPG service data in a database.

The processor 950 can receive EPG service data from the second server 990 periodically or aperiodically.

The processor 950 can identify the EPG service data received from the crawler module 930 and the second server 990 on the basis of previously configured super sets, that is, service list set IDs, processes the identified EPG service data and stores the processed EPG service data in a database 970 on a super set basis (S1012).

The EPG service data can be processed using translation, merging, etc. A service list set ID and basic information necessary for channel switching between broadcast standards can be added for EPG service data search which will be performed later.

Data processing for the advanced EPG service can y be performed through the above-mentioned procedure from S1002 to S1012.

A description will be given of a procedure of providing an EPG service at the request of a digital receiver.

Upon reception of a request for the EPG service from a user, the digital receiver 910 can request the first server 915 to provide the EPG service by transmitting a search parameter including the previously received service list set ID to the first server 915 (S1014).

Here, the search parameter may further include query information, start index information, maximum result information, category information, sort information, etc. in addition to device information. Particularly, an EPG can be set with the category information for EPG service request according to the present invention. When the category is set to 'all', information about a CP tab (e.g. YouTube tab) as well as information about a real-time tab can be received. In the case of a CP tab, uniform resource locator (URL) information alone can be provided.

The controller 920 can check the request of the digital receiver 910 and determine whether the digital receiver 910 requests updated EPG service transmission or requests the EPG service data requested in S1014.

When the controller 920 determines that the digital receiver 910 requests the EPG service data, the controller 920 can transmit a search request including the search parameter to a search module 940 (S1016).

The search module 940 can analyze the search parameter included in the search request.

The search module 940 can transmit a search parameter analysis result to a search engine 980. The search engine 980 can search databases 960 and 970 on the basis of the transmitted search parameter (S1018).

The search engine 980 can transmit search results obtained from the databases 960 and 970 to the search module 940.

The search module 940 can analyze the search results received from the search engine 980, process the search results into a response corresponding to the EPG service provision request determined by the controller 920 in step S1016, and return the response to the controller 920 (S1020).

The response of the search module 940 may take the form of xml, for example.

The controller 920 can transmit EPG service data returned from the search module 940 to the corresponding digital receiver S1022.

Figures 12, 13:
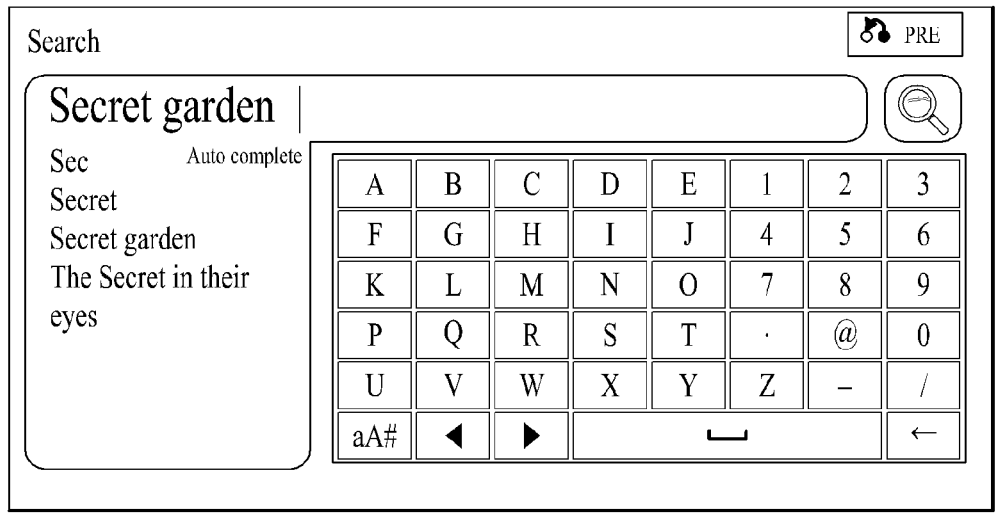
FIG. 12 illustrates an input by a user to be provided with an EPG service according to an embodiment of the present invention.
FIGS. 13 and 14 show exemplary EPG service lists that can be provided at the request of a user according to the present invention.
Figures 14, 15:
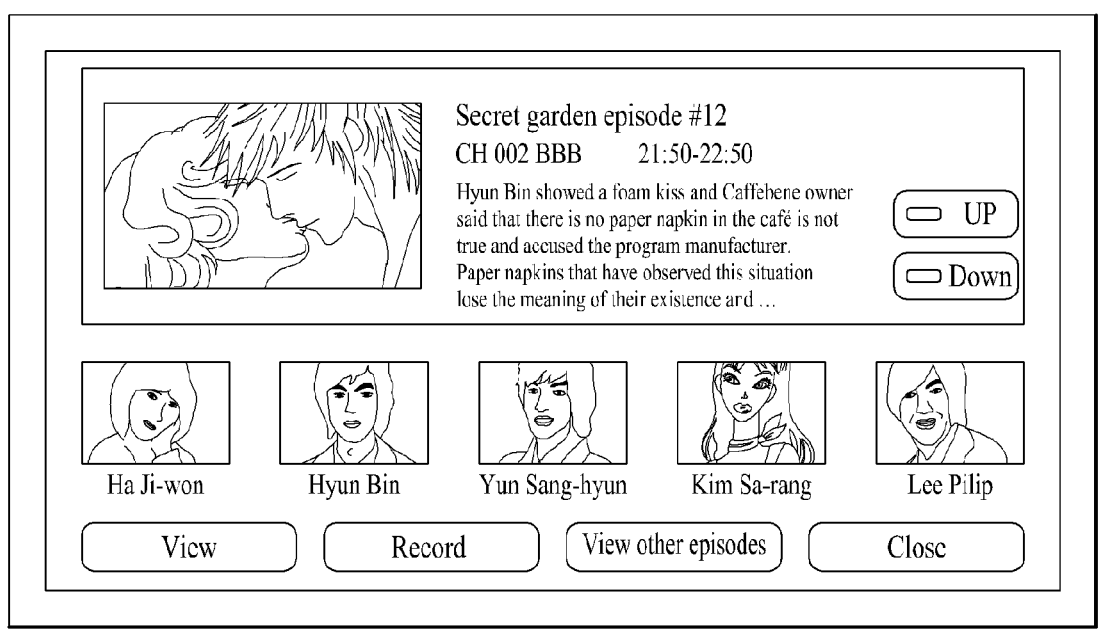
FIG. 15 shows an exemplary EPG service image selected from the EPG service lists of FIGS. 13 and 14.

The digital receiver can parse the EPG service data received from the first server 915, configure an EPG using the parsed result and provides the EPG through a screen to the user (S1024). The parsed EPG service data can be stored in the storage unit. Examples of the EPG provided in this manner are shown in FIGS. 13 and 14. The digital receiver can filter data that cannot be processed or supported by the digital receiver, from among the provided EPG service data, and provide the filtered EPG service data on the screen.

FIG. 11 illustrates a procedure of updating EPG service data in the first server according to an embodiment of the present invention.

Referring to FIG. 11, the left part 1110 can correspond to digital receivers and the right part 1150 can correspond to the first server.

An EPG service data update procedure according to the present invention will now be described using three digital receivers having the same 3-id (UK, ENG, DVB-T) (and/or the same service name), that is, the same service list set ID.

A first digital receiver 1120 can have a list of 6 accessible EPG service data. For example, these 6 EPG service data can include 1. dvb://233a.2f.1, 2. dvb://233a.2f.2, 3. dvb://233a.2f.3, 4. dvb://233a.3f.1, 5. dvb://233a.4f.1, and 6. dvb://233a.4f.2, as shown in FIG. 11.

A digital receiver 1130 can have a list of 5 accessible EPG service data. For example, these 5 EPG service data can include 1. dvb://233a.2f.2, 2. dvb://233a.2f.3, 3. dvb://233a.3f.1, 4. dvb://233a.4f.1, and 5. dvb://233a.6f.1, as shown in FIG. 11.

A digital receiver 1140 can have a list of 5 accessible EPG service data. For example, these 5 EPG service data can include 1. dvb://233a.2f.1, 2. dvb://233a.2f.2, 3. dvb://233a.2f.3, 4. dvb://233a.3f1, and 5. dvb://233a.5f1, as shown in FIG. 11.

These three digital receivers 1120, 1130 and 1140 can have the same service list set ID. That is, the EPG data of the three digital receivers 1120, 1130 and 1140 can belong to one super set.

Only EPG service data other than the same EPG service data among the EPG service data of the three digital receivers 1120, 1130 and 1140, shown in FIG. 11, can be updated to a corresponding super set of the server. That is, EPG service data #2 of the first digital receiver 1120, EPG service data #3 of the second digital receiver 1130 and EPG service data #5 of the third digital receiver 1140 can be updated.

Accordingly, the super set of the server can include 8 EPG service data, that is, 1. dvb://233a.2f.1, 2. dvb://233a.2f.2, 3. dvb://233a.2f.3, 4. dvb://233a.3f.1, 5. dvb://233a.4f.1, 6. dvb://233a.4f.2, 7. dvb://233a.5f.1, and 8. dvb://233a.7f1.

These EPG service data can be examples of EPG data received from the digital receivers belonging to the super set and updated. In other words, the digital receivers which belong to the super set can receive the EPG data list included in the super set when requesting an EPG service.

For example, while the first digital receiver 1120 has 6 accessible EPG service data, it can receive 8 EPG service data included in the super set as a response from the first server 1150 when requesting the first server 1150 to provide EPG service data.

In this case, the first digital receiver 1120 can parse the response of the first server 1150, configure an EPG with the parsed EPG data and provide the EPG to the user.

Here, the first digital receiver 1120 can filter inaccessible EPG service data, configure an EPG without the filtered inaccessible EPG service data and provide the EPG to the user.

For example, since the first digital receiver 1120 cannot access dvb://233a.5f.1 and dvb://233a.7f.1 from among the EPG service data included in the response received from the first server, the first digital receiver 1120 can filter these two EPG service data before providing the EPG to the user. Even the filtered EPG service data can be used to configure the EPG by the digital receiver 1120 if the filtered EPG service data relates to other accessible service data.

The second digital receiver 1130 and the third digital receiver 1140 can provide EPG service in the same manner.

The aforementioned super set can be an example for facilitating description and it may include results obtained by updating EPG service data processed through the controller, crawler and processor included in the first server and then searching the EPG service data through the search module and the search engine.

Figure 16:
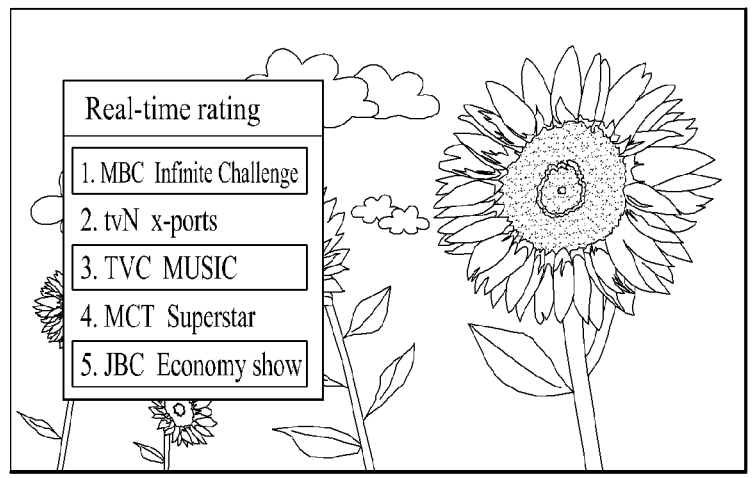
FIGS. 16 and 17 show exemplary images including rating information in addition to EPG service images according to the present invention.
Figure 17:
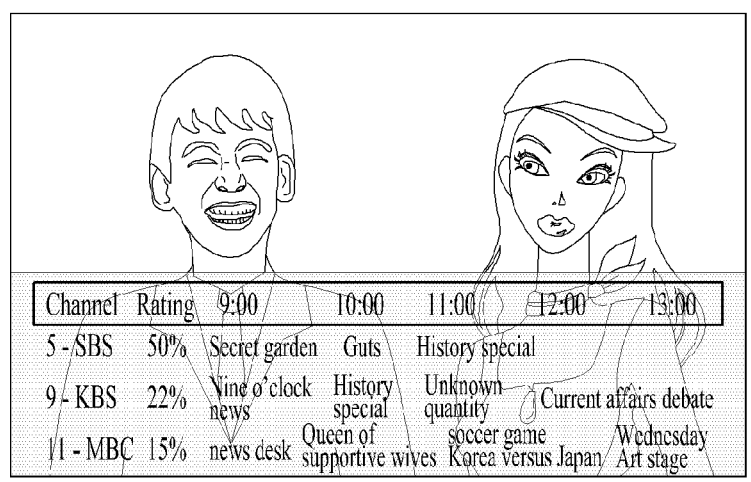

In addition, a digital receiver may transmit rating information about a currently viewed channel or program along with at least one of 3-id and service list set ID periodically or aperiodically during the EPG service update procedure or independently of the EPG service updating procedure. Accordingly, the server can receive the rating information with the EPG data of the digital receiver and provide various services through UIs as shown in FIGS. 16 and 17.

While the above description has been made on the basis of DVB, a channel name (and/or program name) instead of the 3-id and/or service name can be used in the case of the ATSC scheme of North America. That is, the channel name can function as the 3-id.

Accordingly, the server can configure a super set on the basis of channel names of digital receivers and transmits a service list set ID of the super set to the digital receivers. The EPG service update procedure and the EPG search procedure at the request of a digital receiver can be similar to the above-mentioned ones such that detailed description is omitted. However, in the case that EPG service data provided by various sources collide when the channel name is used in the case of North America, only EPG service data provided by one source is selected or all the collided EPG service data are transmitted to a corresponding digital receiver such that the digital receiver can filter the EPG service data based on information such as area information.

FIG. 12 illustrates user input for providing an EPG service according to the present invention. FIGS. 13 and 14 show exemplary EPG service lists which can be provided at the request of a user according to the present invention. FIG. 15 shows an exemplary EPG service screen selected from the EPG service lists of FIGS. 13 and 14 according to the present invention.

Referring to FIG. 12, the user can input 'Secret garden' to a UI provided on the screen using an input means. In this case, the digital receiver can provide an auto complete function for a word or sentence input by the user on the basis of previous input or content of a related service or event.

In the case of FIG. 12, the user can select an input interface on the UI using a spatial remote controller in addition to the input means to input a selected letter or numeral, or input the letter or numeral to a point touched by the user in a touch-screen manner.

When the user inputs 'Secret garden', as shown in FIG. 12, the digital receiver can transmit a service list set ID previously allocated thereto and the user input as search parameters to the first server, as described with reference to FIG. 9.

The controller included in the first server can transmit the search parameters transmitted from the digital receiver to the search module. The search module can analyze the search parameters and drives the search engine.

The search engine can search databases on the basis of the search parameters and read a search result. The search engine can transmit the read search result to the search module or directly process the same into a response. When the search engine transmits the search result to the search module, the search module can process the search result into a response.

The controller can receive the response including a search result list about 'Secrete garden' at the request of the user, from the search module and transmit the response to the digital receiver.

The digital receiver can receive the response from the first server, parse the response, configure an EPG, as shown in FIG. 13 or 14, for example, at the request of the user on the basis of the parsed data, and provide the EPG.

FIG. 13 shows an EPG when a category as a search parameter is limited to EPG and FIG. 14 shows an EPG when the category is set to ALL.

Referring to FIG. 13, three channels can be aligned. The first channel can correspond to terrestrial channel (Ch) 002 BBB over which 'Secret garden' episode #12 is broadcast in high definition (HD) from 20:00 to 21:00, and the second channel can correspond to cable channel 024 CCC over which 'Secret garden' episode #12 is rebroadcast in standard definition (SD) from 23:00 to 24:00. The third channel can correspond to cable channel 069 DDD over which 'Secret garden' episode #12 is broadcast in SD at the same time zone as the channel 002 BBB. The third channel can also provide a thumbnail image and a synopsis.

Referring to FIG. 14, two channels and two CPs can be provided. The first channel can correspond to terrestrial (DVB-T) channel 002 BBB over which 'Secret garden' episode #12 is broadcast in HD from 20:00 to 21:00, and the second channel can correspond to cable (DVB-C) channel 024 CCC over which 'Secret garden' episode #12 is rebroadcast in SD from 23:00 to 24:00. The first CP can have address URL-1 with respect to 'Secret garden' episode #12 in SD and the address URL-1 can include a thumbnail image. Here, a URL-3 through which the thumbnail image can be downloaded can be provided. The second CP can have address URL-2 with respect to 'Secret garden' episode #12 and the address URL-2 can include a thumbnail image and a synopsis. An address URL-4 with respect to the thumbnail image and synopsis can be provided.

When the user selects items regarding a specific channel or CP from the EPG of FIG. 13 or 14, the digital receiver can be switched to the corresponding channel or linked to the URL of the corresponding CP to download corresponding content.

The digital receiver can provide a UI for playback, recording/reservation recording, and recording management of the corresponding content according to user selection, which is not shown, and perform an operation corresponding to a specific function of the UI, selected by the user.

If the user selects the first channel from the EPG of FIG. 13 or 14, the digital receiver can provide a UI or an OSD image as shown in FIG. 15.

Referring to FIG. 15, the EPG UI can provide a representative thumbnail image, channel information, time information and synopsis information about the requested 'Secret garden' episode #12.

Furthermore, the EPG UI can include UP/DOWN buttons such that the user can read the entire synopsis by using the UP/DOWN buttons when the entire synopsis is not displayed as one image because it is long. The UP/DOWN buttons can function as channel UP/DOWN buttons. For example, when the user determines from the provided EPG data that 'Secret garden' episode #12 requested by the user is a previously viewed episode, the user can change the channel to another channel using the UP/DOWN buttons.

In addition, the EPG UI can provide thumbnail images of leading characters or extras. In this case, when the user selects a specific character, information about the selected character can be provided. For example, the information can include hair style, fashion and features of the character, information on an actor/actress who performs the character, etc.

The EPG, UI and OSD image of FIGS. 12 to 15 can be exemplary and the present invention can be not limited thereto.

FIGS. 16 and 17 show exemplary advanced EPGs including rating information according to embodiments of the present invention.

During the procedure of updating EPG data, the digital receiver can include rating information containing information about a currently viewed channel in the EPG data and transmit the EPG data including the rating information, as described above, to implement an advanced EPG as shown in FIGS. 16 and 17.

FIG. 16 shows an EPG for providing real-time rating at the request of the user while the user is viewing a specific channel or program and FIG. 17 shows an EPG including rating information which is provided when the user requests the EPG. While the rating information is represented as numerals in FIG. 17, the rating information can be represented in various forms such as a bar, bar-and-numeral, etc.

As described above, digital receivers linked through a network can update EPG data periodically or aperiodically, and the server can collect, combine and process the EPG data updated by the digital receivers and EPG data provided by an EPG providing server, and provide a processed advanced EPG service when a user of a specific digital receiver requests an EPG service.

A description will be given of a channel browser. The basic concept of processing the channel browser can be similar to the EPG service data processing scheme and thus, for a detailed description thereof, reference should be made to the above description and explanation is focused on the channel browser.

Figure 18:
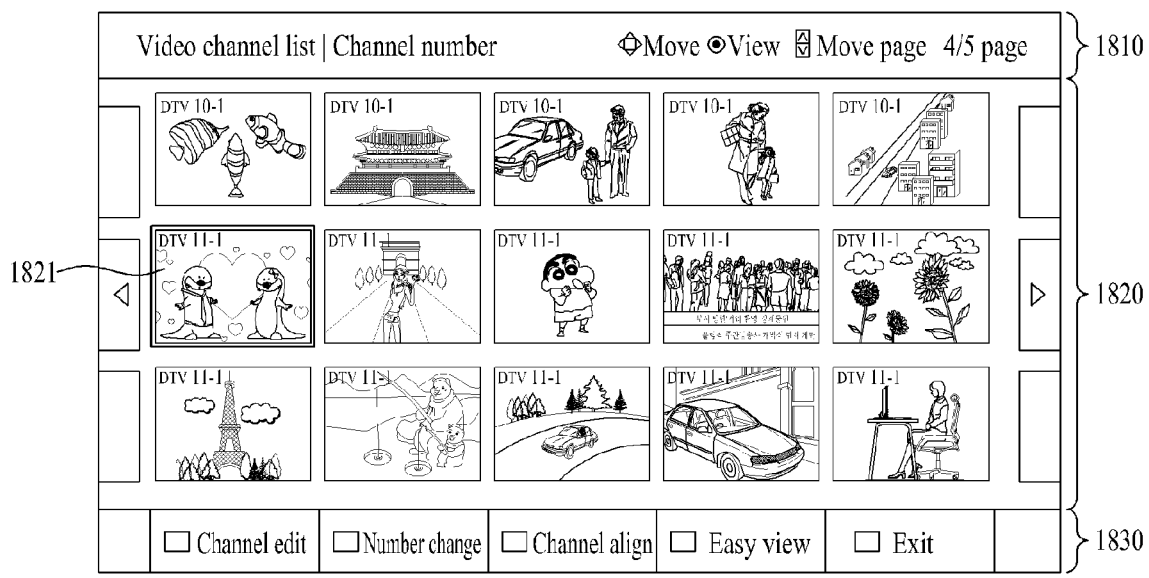
FIG. 18 shows an exemplary channel browser service providing screen according to the present invention.

FIG. 18 shows an exemplary advanced channel browser according to an embodiment of the present invention.

Data required to configure a channel browser can be extracted from service information included in a digital broadcast signal transmitted from a broadcasting station or provided by a channel browser providing service similar to an EPG providing server.

However, digital receivers can have different channel coverages and channel browser servers cannot practically provide channel browsers for all channels accessible by the digital receivers due to their limited channel coverages. Accordingly, when a user requests a digital receiver to provide a channel browser, black images may be provided for some channels while thumbnail images are provided for some other channels. This may lead to dissatisfaction of the user of the digital receiver and broadcast service.

To solve this problem, the present invention can process a channel browser using a broadcasting system as shown in FIG. 9 in a manner similar to the aforementioned EPG service provision method.

The digital receiver can capture a current image as a back channel and store the captured image as a thumbnail image for a channel browser for a currently tuned channel even when there is no user request.

A thumbnail image captured for a specific channel can be configured in the form of 3-id and transmitted to the first server along with updated EPG data or independently of the updated EPG data.

The thumbnail image can be captured in various manners. For example, when channel change occurs, the image of the changed channel can be captured. Furthermore, the current image can be periodically captured. In this case, the digital receiver can select the latest thumbnail image from captured images of channels, stored therein, handle the selected thumbnail image as a representative thumbnail image about the channel corresponding thereto, and transmit the selected thumbnail image as data for channel browser update to the first server.

The controller in the first server can transmit updated channel browser data to the crawler module. The crawler module can analyze the channel browser data and transmit an analysis result to the processor.

The processor may collect and combine updated channel browser data regarding respective channels and channel browser data additionally provided by the channel browser server and process the combined channel browser data on the basis of service list set IDs. The processed channel browser data can be stored in a database, separately from EPG data, for example.

Since the channel browser data is a thumbnail image, the thumbnail image can be separately stored and, simultaneously, a URL by which the thumbnail image can be accessed is stored.

The stored channel browser data can be used in the following manner. When the user requests a channel browser, a search parameter for channel browser search can be transmitted to the first server in a manner similar to the above-mentioned EPG data processing method, the controller in the first server can transmit the search parameter to the search module, and the search module can analyze the search parameter and drive the search engine on the basis of the analysis result.

The search engine can collect data relating to the channel browser by searching a database on the basis of the search parameter transmitted from the search module and delivers the data to the search module.

The search module can process the collected channel browser related data into a response including URLs by which thumbnail images of channels are accessed at the request of the user and transmit the response to the corresponding digital receiver via the controller.

The digital receiver can parse the response to read the channels and URLs of the channels, extract a thumbnail image regarding a corresponding channel by accessing the read URL corresponding to the channel and provide the thumbnail image to the user as the channel browser.

FIG. 18 illustrates update of a thumbnail image or channel browser service data using the service system as shown in FIG. 9. However, differently from EPG service data, the thumbnail image or channel browser service data can be processed using a cloud server system which will be described below. In this case, the digital receiver can transmit/receive EPG service data through the service system as shown in FIG. 9 and channel browser service data through a cloud server system as shown in FIG. 19, to thereby provide an advanced service guide, as shown in FIGS. 22 to 25, to the user.

Figure 19:
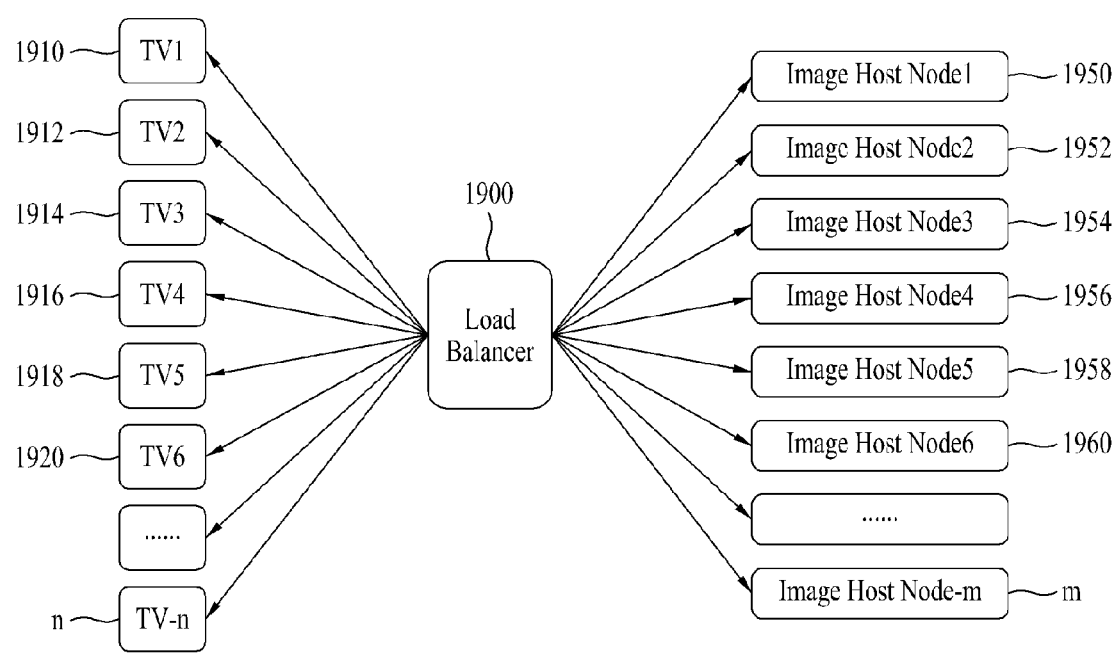
FIG. 19 illustrates a cloud server system according to an embodiment of the present invention.

FIG. 19 illustrates an exemplary cloud server system according to an embodiment of the present invention.

Referring to FIG. 19, the cloud server system according to an embodiment of the present invention can include digital receivers 1910 to n (n being a positive integer), a load balancer 1900, and image host nodes 1950 to m (m being a positive integer). The load balancer 1900 and the image host nodes 1950 to m can be regarded as a server and the digital receivers 1910 to n can be regarded as a client. The server may be a cloud server.

The server of the cloud server system can upload an image from each digital receiver for a combination of a 3-id and a service name of the digital receiver at intervals of a predetermined time. The predetermined time may be 10 seconds. The server can be controlled to receive a predetermined number of uploads or more per 10 seconds. Here, the predetermined number can correspond to at least 30,000, for example.

In addition, the server can download the latest image to a specific digital receiver 1910 to n with a specific combination of a 3-id and a service name.

The server need not include a permanent storage medium for storing images. The server can temporarily store images received from the digital receivers and need not permanently store previous images when considering memory capacity (each image has a size of 50 to 100 KB), cost, etc. because the previous images can be deleted whenever an image is updated. Therefore, a permanent storage medium need not be provided to the server. That is, when a new image is received, a previous image can be deleted because it is not necessary any more.

When the server receives an image upload request from a digital receiver for a specific combination of a 3-id and a service name, if the requested image corresponds to an image received before the aforementioned predetermined time, the server can reject the image upload request of the digital receiver even when the digital receiver corresponds to the specific combination of a 3-id and a service name. In this case, the server can transmit a next upload request time as a response according to the rejection to the digital receiver. The next upload request time can be increased by one second for each rejection if a default upload request time is 10 seconds, for example. However, if the request time exceeds 300 seconds (5 minutes) due to continuous rejection, the next upload request time can be not further increased. The continuously increased request time can be automatically initiated when a corresponding request is accepted at a specific time. That is, the next upload request time can be 10 seconds. When a service or a channel is changed, the server can ignore previous image data and upload current image data as a default value.

As described above, the server in the cloud server system can do not need a permanent storage medium or database and each node thereof requires only a memory having a capacity of 4 GB or more in consideration of 100 KB*30,000=3 GB+α.

The digital receivers in the cloud server system may not one-to-one correspond to the image host nodes in the cloud server system. In this case, server error, data error, user dissatisfaction, system error, etc. are generated if the digital receivers and the image host nodes are not controlled and operated such that transmission and reception of image data are appropriately distributed between the digital receivers and the image data nodes. To achieve this, the server may include the load balancer 1900 which performs load balancing of the nodes for a combination of a 3-id and a service name.

Accordingly, necessary tables and images can be stored in the memories of the nodes and a specific scheme can be applied to the 3-id and service name.

The load balancer 1900 can use a server load balancing algorithm corresponding to one of round robin, list connection, response time, hash, minimum missies, and bandwidth based load balancing schemes. The hash scheme can be exemplified in the following description to assist in understanding of the present invention and improve convenience of explanation.

The hash scheme can be a load balancing scheme using a hashing algorithm provided by Alteon. In the hash scheme, a source IP can be used as an element which generates an index for a server in a real server group. While service requests of the same user are connected to the same server, the service requests can be reassigned if a service error is generated in the server or a certain real server is excluded from the real server group or added thereto. The hash scheme can support maximum connection though it cannot use a weight option. Accordingly, the hash scheme can perform impartial load balancing in case of a large number of users.

The hashing algorithm can designate a path with a hashing key for each client when a new connection (TCP/UDP) is formed. The hashing key can be determined by the IP and port of a client or only by an IP address of the client. When a session is established between a specific client and a server, the server can be connected to only a specific server by maintaining the session. This method can determine a server to which a client will be connected using a value obtained by dividing a client source IP address (32 bits) by the number of real servers.

Specifically, a source IP and a destination IP can be combined. For example, if a source IP '192.168.1.1' and a destination IP '10.10.10.254' are present, a source can correspond to a user, and a destination can correspond to vip, the source IP and the destination IP can be combined to generate a certain figure. For example, the end figures of the source IP and the destination IP, that is, 1 and 254, can be summed to obtain 255, and then, 255 is divided by the number of real servers. If there are three real servers, the remainder is 0 (255/3=85 with remainder 0). In this case, the corresponding client can be connected to real server #1. If the combination of the source IP and the destination IP is 124, the remainder can be 1 (124/3=41 with remainder 1), leading to assignment of the corresponding client to real server #2.

According to this scheme, the corresponding client can be connected to the same server whenever it attempts to access a server because the destination, vip, and client IP of the client are fixed.

This scheme can be mostly used by a site (authentication, security, etc.) which needs to maintain a session. A server can be set on the basis of a value obtained by generating a hash table with an LP. Accordingly, a real server selected by a client once can continuously provide a service to the client. According to this hash scheme, a path can be guaranteed, a large memory capacity can be not needed, and a request procedure can be simplified.

In the case of the cloud server system of FIG. 19, an upload IP address can be 'http://A2.com/lg_epg_thumbnail/post?id=dvb://233a.2f.1 & service_name=BBC1' and a download IP address can be 'http://A3.com/lg_epg_thumbnail/get?id=dvb://233a.2f.1 & service_name=BBC1'.

Therefore, the load balancer 1900 can determine an image host node using the hash scheme for a combination of a 3-id and a service name during an upload/download procedure when a digital receiver is connected thereto through the IP addresses.

The image host nodes of the server, shown in FIG. 19, can easily compute and provide rating information by counting uploaded images. In this case, a specific image host node or an additional computation server can be provided to collect rating information regarding a specific channel or service, classified and stored the rating information by communicating with each node.

FIG. 20 illustrates an exemplary table stored in the cloud server system according to the present invention.

In FIG. 19, the load balancer 1900 can need to newly generate the table shown in FIG. 20 when a combination of a 3-id and a service name is not prevent while the hash scheme is used.

Referring to FIG. 20, the table can include information such as a 3-id (region/MUX/service) of 'dvb://233a.2f.1', a service name of 'BBC1', the final reception time of 09:25:20

(GMT) 2011-5-11, next upload time if connection is refused (NUTCR) of '10 seconds', and JPG file data (memory) as image data. The type and format of the image data can be not limited to the aforementioned JPG and present and future formats which can be used as types and formats of image data, such as gif, bmp, etc. can be employed.

Upon reception of an image, the server can store the image and reset the NUTCR to 10 seconds. When an upload request is received from a digital receiver before the final reception time, 09:25:20 2011-5-11, the server can refuse connection of the digital receiver and increase the NUTCR by one second. This NUTCR can be transmitted from the server to the corresponding digital receiver. Then, the digital receiver that has received the connection refusal response from the server attempts to upload the next image after the NUTCR. Even in this case, the NUTCR can be reset when channel change occurs.

Figure 21:
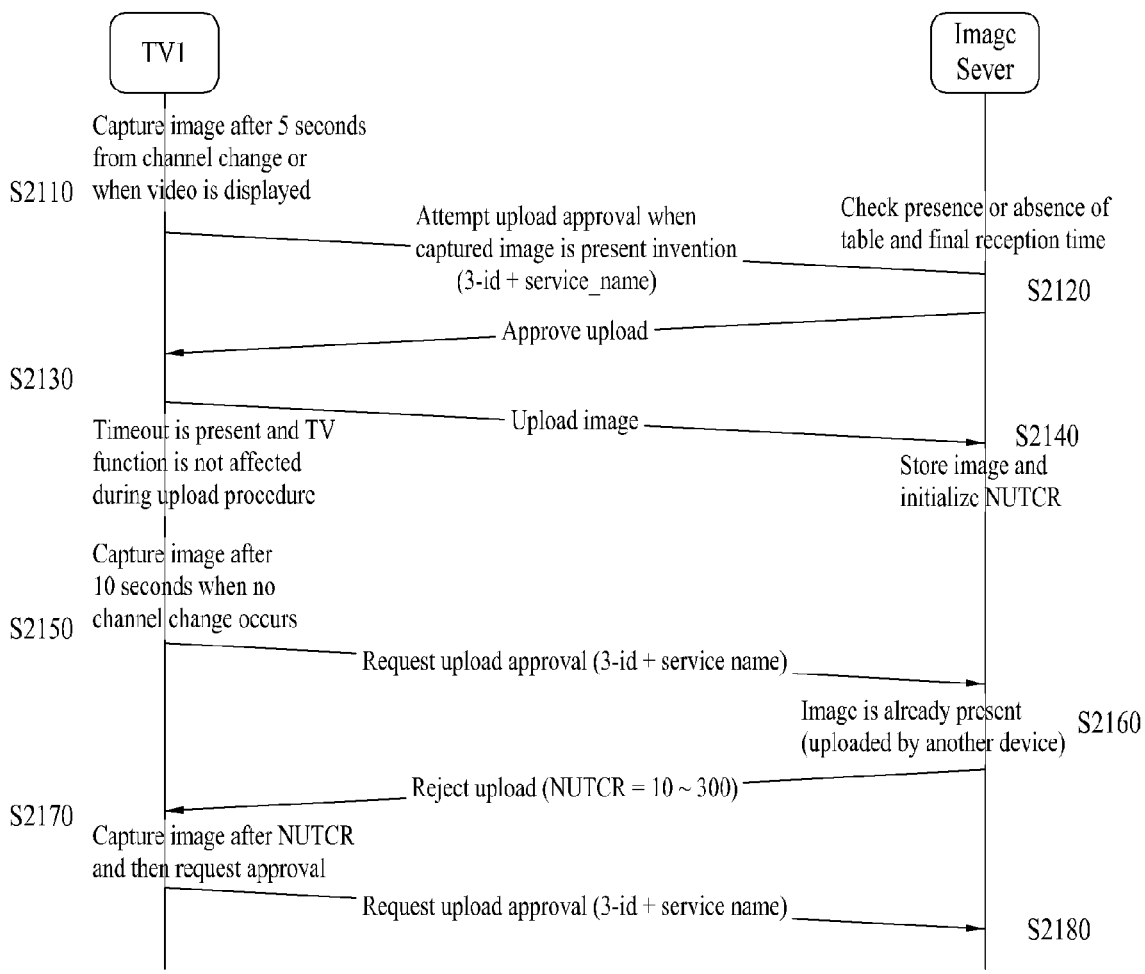
FIG. 21 illustrates a data transmission/reception procedure performed in the cloud server system shown in FIG. 19 according to an embodiment of the present invention.

FIG. 21 is a flowchart illustrating a procedure of transmitting and receiving data in the cloud server system shown in FIGS. 19 and 20 according to an embodiment of the present invention.

FIG. 21 shows a data transmission/reception procedure between one digital receiver and one image server, in which the hash scheme and NUTCR described with reference to FIGS. 19 and 20 are applied.

A digital receiver TV1 can capture an image when 5 seconds passes or video is displayed after channel change. When there is a captured image, the digital receiver TV1 requests approval of upload of the captured image with a 3-id and a service name (S2110).

An image server can check presence or absence of a corresponding table and the final reception time on the basis of the combination of the 3-id and service time, and then approve image upload of the digital receiver TV1 when a condition is satisfied (S2120).

The digital receiver TV1 can upload the captured image according to approval of the image server (S2130). Here, it is necessary for the digital receiver TV1 to have a timeout and perform a TV function thereof during the upload operation. The timeout can correspond to a wait time for image upload after upload approval, for example, NUTCR.

The image server can store the image received from the digital receiver TV1 and reset the NUTCR (S2140).

If channel change does not occur, the digital receiver TV1 captures an image after default time, that is, 10 seconds, and requests image upload approval (with the combination of the 3-id and service name) according to the above-mentioned method (S2150).

The image server can determine whether the image corresponding to the upload approval request of the digital receiver TV1 is already present. When the image has been uploaded by another digital receiver and is present, the image server can reject the upload approval request of the digital receiver TV1 (S2160). At this time, the image server can increase the NUTCR by one second and transmit the NUTCR along with a response according to the upload request refusal to the digital receiver TV1. A NUTCR update period may impose a burden on the server when it is too short whereas service data update is not properly performed when it is excessively long, and thus it is not desirable that the NUTCR be increased unlimitedly even when an upload approval request is refused. Therefore, the NUTCR preferably wraps around within one to 1000 seconds, particularly, within 10 to 300 seconds.

When no channel change occurs, the digital receiver TV1 captures an image and requests image upload approval after a lapse of time (e.g. 11 seconds) based on the NUTCR of a response received from the image server (S2170/S2180). The image server can determine whether or not to approve the image upload of the digital receiver TV1 (which is not shown). When the image server rejects the image upload, the image server increases the NUTCR and transmits it along with a response to the image upload approval request to the digital receiver TV1. If the image server approves the image upload of the digital receiver TV1, the image sever can reset the NUTCR and transmit a response including the reset NUTCR to the digital receiver TV1.

The aforementioned operation can be repeated if there is no channel change between the digital receiver TV1 and the image server. When the digital receiver TV1 changes channels, all the conditions can be initialized and the procedure can be sequentially performed from S2110.

Figure 22:
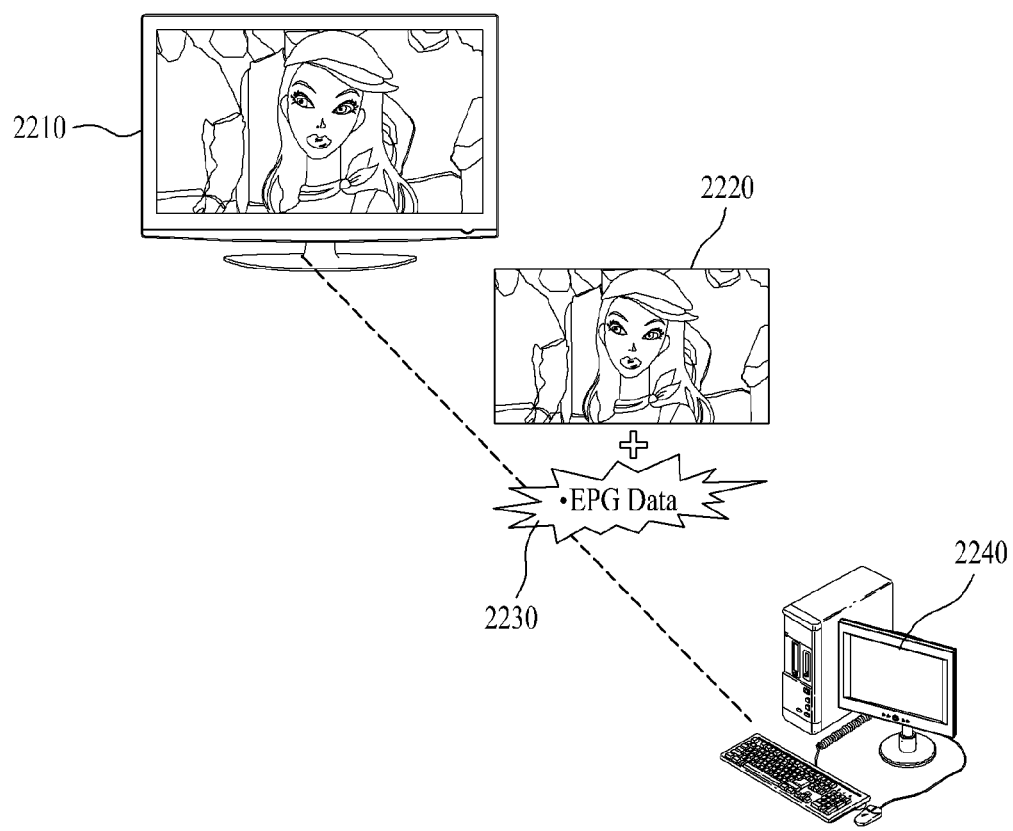
FIG. 22 shows an exemplary service provision method in a service system according to an embodiment of the present invention.

FIG. 22 illustrates an exemplary service provision method in a service system according to an embodiment of the present invention.

The service system can be implemented as a combination of the service system shown in FIG. 9 and the service system shown in FIG. 19. For example, EPG service data can be processed by the service system of FIG. 9 in the combined service system and channel browser data and thumbnail image data can be processed by the service system of FIG. 19 in the combined service system. In this case, the controller 920 shown in FIG. 9 can control the service system of FIG. 9 and/or the service system of FIG. 19 to process service data received from each digital receiver.

Referring to FIG. 22, a digital receiver 2210 can upload or download EPG service data 2230 and thumbnail image data or channel browser data 2220 to or from a service system 2240 implemented as a combination of the service systems of FIGS. 9 and 19.

The digital receiver 2210 can transmit one of the EPG service data 2230 and the thumbnail image data or channel browser data 2220 to the service system 2240. Otherwise, the digital receiver 2210 can simultaneously upload or download the EPG service data 2230 and the thumbnail image data or channel browser data 2220 since the updated thumbnail image data or channel browser data 220 relating to the EPG service data may be necessary for an advanced EPG service. Even when the digital receiver 2210 uploads only one of the EPG service data 2230 and the thumbnail image data or channel browser data 2220, the digital receiver 2210 can download the same from the service system 2240.

FIGS. 23 to 26 illustrate exemplary user interfaces (UXs) of a digital receiver according to an embodiment of the present invention.

Figure 23:
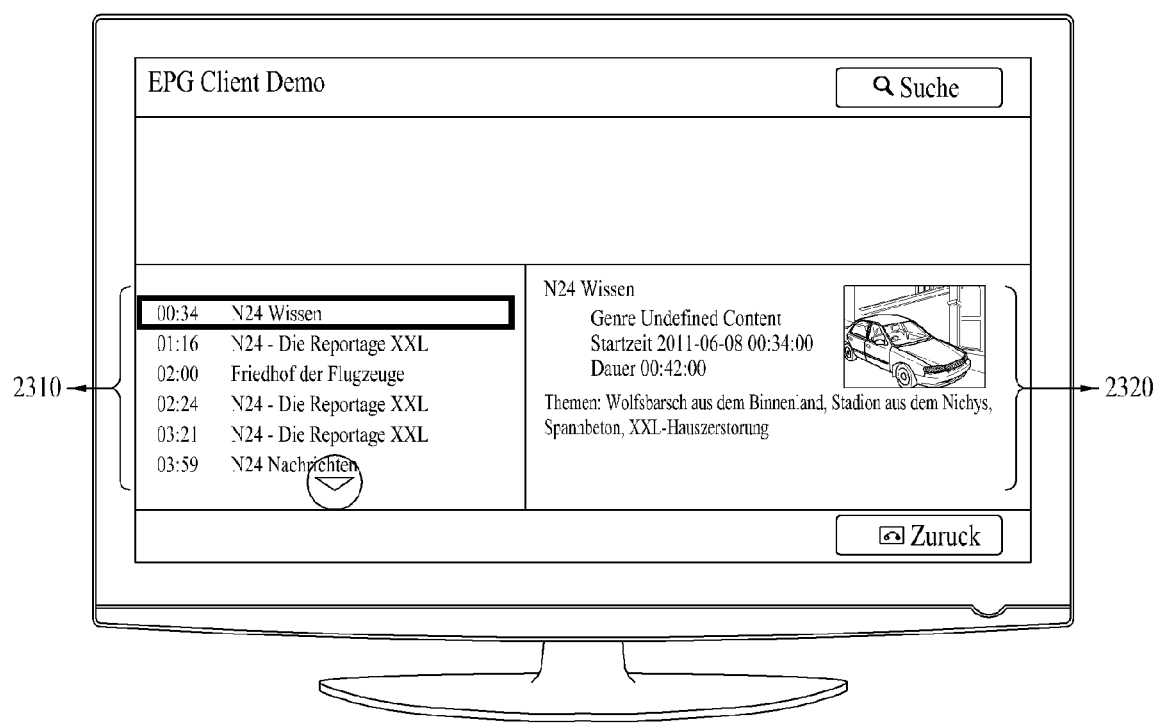
FIGS. 23 to 26 illustrate exemplary UX of a digital receiver according to an embodiment of the present invention.
Figure 24:
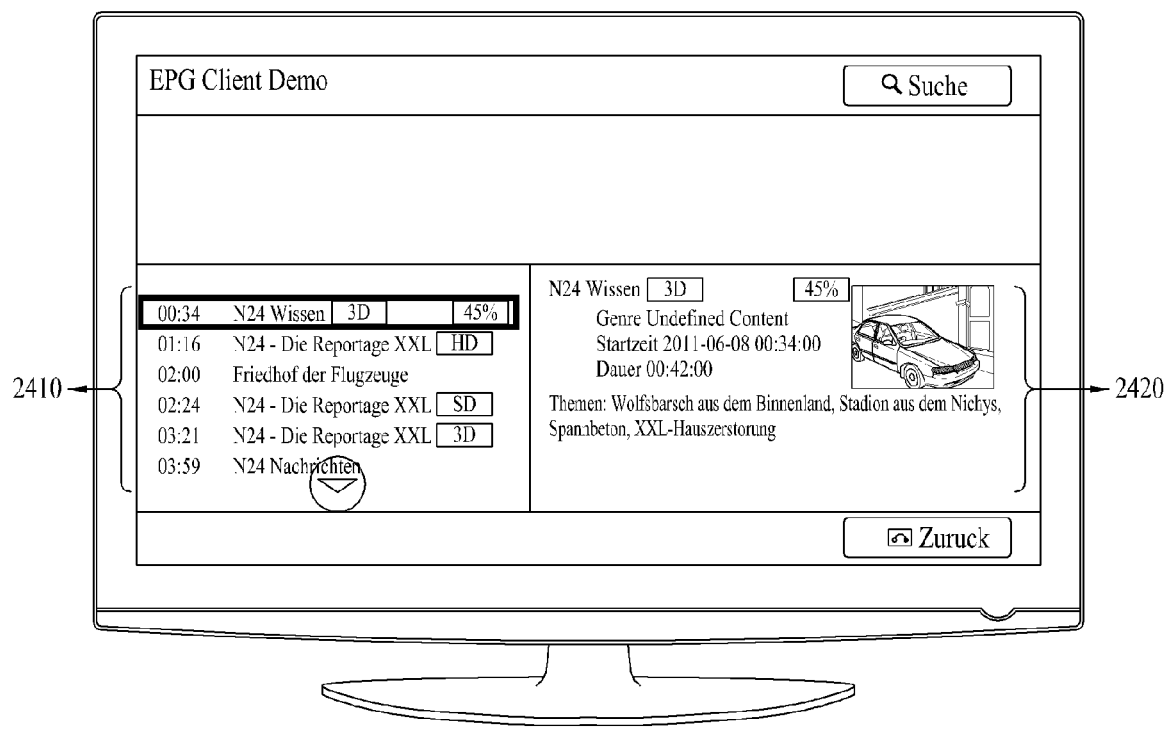
Figure 25:
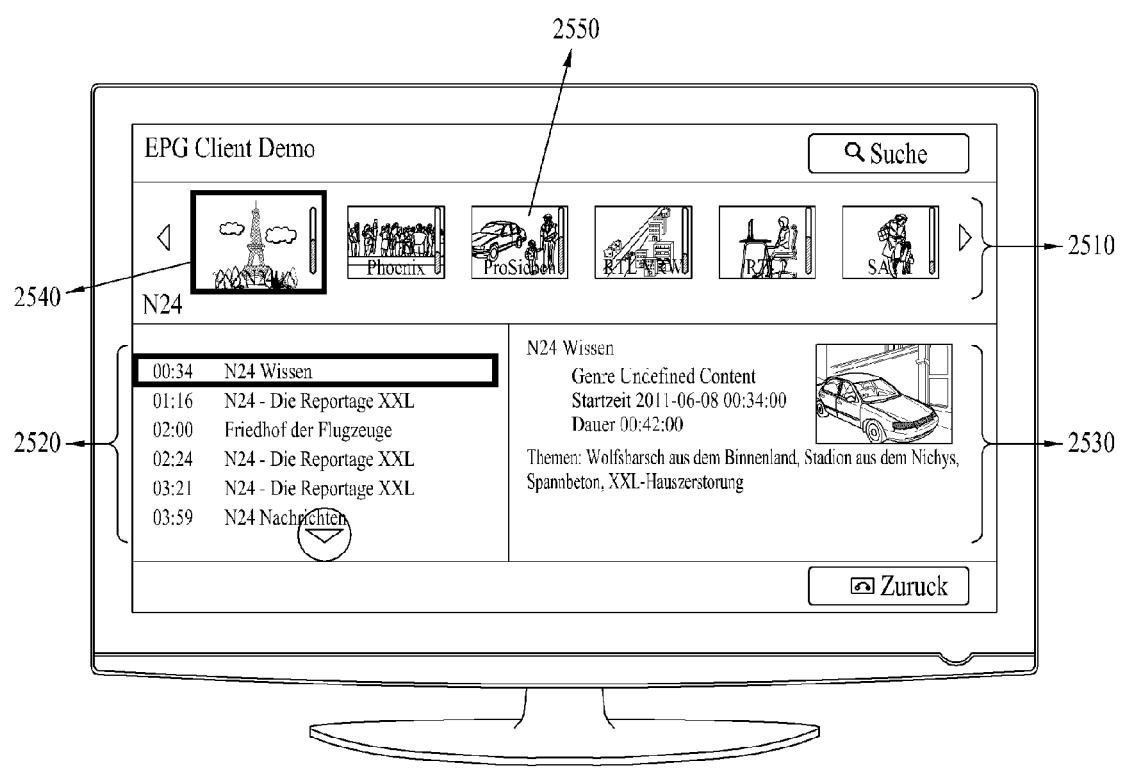
Figure 26:
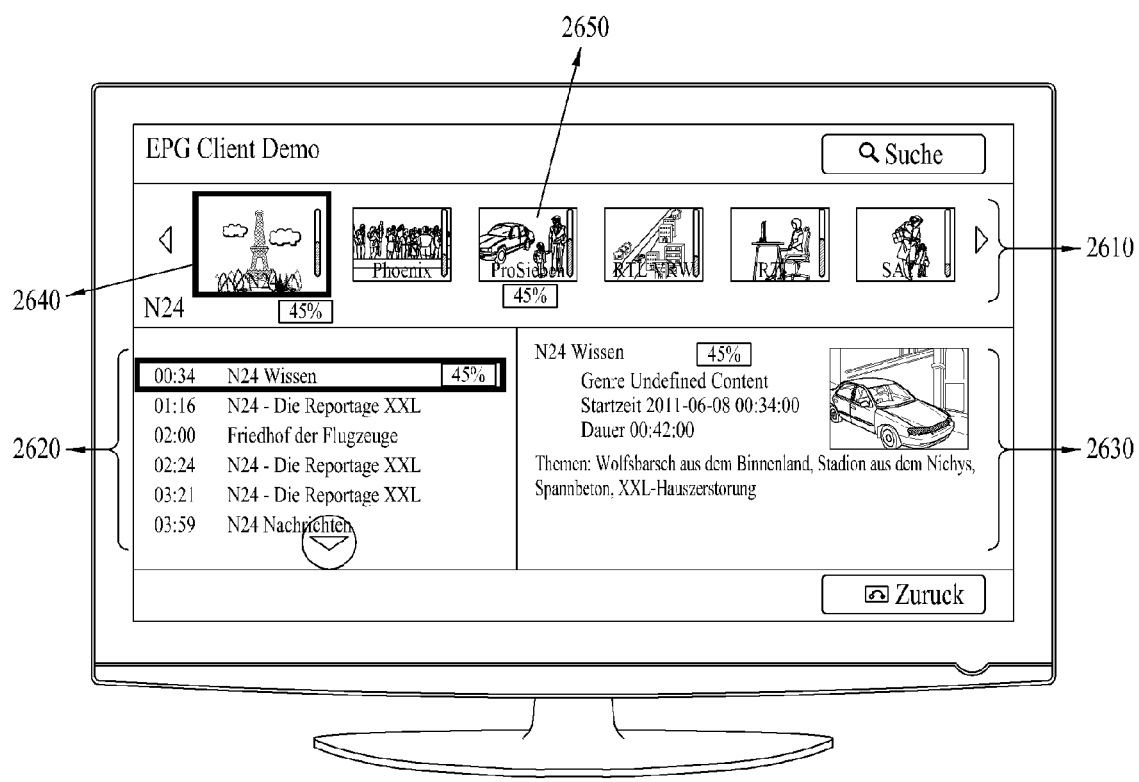

FIGS. 23 to 26 show UXs which can be implemented in a digital receiver according to the above-mentioned method. FIGS. 23 and 24 can show a case in which a channel browser capable of providing PIP is not present and FIGS. 25 and 26 show a case in which a channel browser capable of providing PIP is present.

FIGS. 23 and 24 respectively illustrate a case including additional information and a case having no additional information. Overlapping parts of FIGS. 23 and 24 are described first and different parts thereof will be described later.

Referring to FIGS. 23 and 24, a digital receiver can receive advanced EPG service data by communicating with a server at the request of a user, as described with reference to FIGS. 9 to 22.

Then, the digital receiver can implement an EPG service through OSD. The left area 2310 of the screen displays programs of corresponding channels during 8 days on the basis of the current channel (00:34 N24 Wissen). Since the digital receiver cannot display all programs due to screen size restriction, the digital receiver can display only a predetermined number of programs which will be broadcast in the future on the basis of the current time and display information about the following programs when the user presses an arrow button.

The right area 2320 of the screen can display detailed information about the current time and a selected program. Referring to FIGS. 23 and 24, a service title N23, a program title Wissen, genre information which corresponds to undefined content in this case, start time 211-06-08 00:34:00, a duration 00:42:00, a thumbnail image, the theme and detailed explanation of the selected program. In this case, the program can be viewed if a PIP function is set to the region in which the thumbnail image is displayed. Alternatively, a synopsis or video skim of a broadcast program can be provided even if the program is not currently broadcast.

FIG. 24 shows an EPG service more advanced than the EPG service illustrated in FIG. 23. For example, the digital receiver can provide rating information (45%), resolution and content type (2D/3D/SD/HD) in addition to start time, service name and program title through the left area 2410 of the screen thereof. The resolution and content type can be provided only in the case of 3D and HD and they are not displayed in the case of 2D and/or SD. Furthermore, the rating information can be provided only for a selected program or all programs whose rating information has been collected. The rating information can be provided in various forms including a bar shape, instead of figures. In addition, the rating information can be provided in different colors or shapes based on rating levels such that the user can easily recognize the rating information.

The digital receiver can provide detailed information through the right area 2420 of the screen thereof, as shown in FIG. 23. The right area 2420 can provide at least one of resolution, content type information and rating information independently of the left area 2410 or in connection with the left area 2410. In other words, the digital receiver can display the resolution and content type information and the rating information on at least one of the left area 2410 and the right area 2420 of the screen thereof.

In the case illustrated in FIGS. 23 and 24, the digital receiver can communicate with the server shown in FIG. 9 or the cloud service system shown in FIGS. 19, 20 and 21 to receive updated latest thumbnail image data or channel browser service data. Furthermore, the digital receiver can use existing data without communicating with the server or the cloud server system.

A description will be given of a UX of a digital receiver which provides a channel browser service capable of executing a PIP function.

Referring to FIGS. 25 and 26, the upper area 2510 of the screen can provide a channel browser service and left and right areas 2520 and 2530 of the lower part of the screen respectively provide a program list and detailed information about a selected program as described above.

The upper area 2510 can provide a channel browser including thumbnail images of a program of each channel or service, which is currently broadcast. When a specific service is selected using the input means as shown in FIG. 7, the information displayed in the left and right areas (2520 and 2530) of the lower part of the screen can be changed.

When the digital receiver receives updated information by communicating with each server of the aforementioned service system, the digital receiver can provide updated thumbnail images through the channel browser service by decoding the received updated information. In addition, rating information 2550 about a corresponding service can be provided in a bar shape on the right of each channel browser image. The rating information can be provided in a bar shape and/or figures.

The digital receiver can configure the channel browsers such that one thereof can be implemented as PIP. For example, if the leftmost region 2540 of the upper area 2510 of the screen is a PIP region, a channel or service corresponding to the region 2540 can be provided according to PIP and program list information and detailed information about the channel or service can be provided through the area below the PIP region 2530. Alternatively, the digital receiver can control the channel browsers such that the region 2540 provides only a thumbnail image for the channel browser service and a predetermined region in the right area of the lower part of the screen, which provides detailed information, is configured as a PIP region.

Differently from the UX illustrated FIG. 25, the UX of FIG. 26 can provide at least one of resolution and content type information and rating information to at least one of each channel browsers, a program list and detailed information.

In addition, the digital receiver and the server can check an update procedure to be performed therebetween and carry out the update procedure only by checking version information in the event of approval request and rejection before update of service data. Specifically, the digital receiver can transmit the version information to the server, and the server can check only the version information and transmit an approval response when the version information corresponds to the latest version. The digital receiver can transmit an upload approval request only when the approval response is received from the server. An update procedure can be performed upon reception of the approval response from the server.

The digital receiver can acquire service data from SI information. In this case, the SI information can be transmitted in the form of a section. However, the digital receiver may not receive an end section of SI information composed of a plurality of sections. In this case, the digital receiver may have a problem in acquiring and updating the service data from the SI information. In principle, after all sections of the service information including the end section are parsed, the service data composed of the information can be updated. However, when the end section is not received or a long time is taken to receive the end section, it is necessary to determine when the service data is updated. In this case, when about 80% of the whole sections of the SI information have been received, the digital receiver can upload the service data after a predetermined time as a wait time for receiving the remaining 20% according to a service count. Alternatively, the digital receiver can upload the whole service data irrespective of version when the service data is continuously viewed for a predetermined time (e.g. 20 minutes) or longer and uploads the remaining service data that is not uploaded after the lapse of the predetermined time. Upload according to continuous viewing can be permitted only once per predetermined time for each service.

According to the present invention, it is possible to improve the channel coverage of a digital receiver and provide advanced EPG, thumbnail image and channel browser services with abundant metadata for each program.

The digital receiver and operating method thereof according to the present invention are not limited to the aforementioned embodiments, and all or some of the embodiments may be selectively combined such that the embodiments can be modified in various manners.

The operating method of the digital receiver according to the present invention can be embodied as computer readable code on a computer readable medium. The computer readable medium can be any data storage device that stores data which can be read by a computer system. Examples of the computer readable medium can include a read-only memory (ROM), random-access memory (RAM), CD-ROM, magnetic tape, floppy disk, optical data storage devices, and so on. The computer readable medium can also be embodied in the form of carrier waves such as signals communicated over the Internet. The computer readable medium can also be distributed over a network of coupled computer systems so that the computer readable code is stored and executed in a distributed fashion.

Although the present invention has been described with reference to the limited embodiments and the drawings, the present invention is not limited to the embodiments and those skilled in the art will be able to make various modifications and changes from the description. Accordingly, the scope of the present invention should not be determined by the above description but should instead be determined by not only the appended claims but also equivalents to the claims.

What is claimed is:

1. A method of processing service data at a digital receiver in a service system, the method comprising:
   receiving a broadcast signal including a content and signaling information for the content from a broadcasting station, and generating first service data based on the signaling information at the digital receiver;
   transmitting device information including to a first server;
   receiving a group identifier (ID) by combining a service name for the first service data and three IDs included in the device information from the first server, wherein the three IDs include an original network ID, a transport stream ID, and a service ID;
   transmitting a service list including the received group ID and the generated first service data to the first server at a first interval;
   requesting second service data to the first server;
   receiving the second service data based on a search parameter in response to the request from the first server; and
   outputting a service guide based on the second service data;
   wherein the second service data is configured from mixed first service data, which is transmitted from one or more digital receivers and crawled at the first server, and additional service data for the first service data transmitted from a second server at the first server, and
   wherein each respective digital receiver is configured to filter out service data, which is inaccessible by each respective digital receiver, among the second service data, store service data except for the filtered service data from the second service data and configure the service guide using the stored service data.

2. The method according to claim 1, wherein the one or more digital receivers are connected with the first server and assigned a same group ID in the service system based on the device information.

3. The method according to claim 2, wherein the first service data and the second service data include at least one of EPG data, channel browser data and thumbnail image data.

4. The method according to claim 3, further comprising:
   requesting service list transmission approval to the first server at the first interval;
   receiving a first response to the request from the first server; and
   determining whether or not to transmit the service list on the basis of the first response.

5. The method according to claim 4, further comprising:
   when the first response corresponds to transmission approval rejection, changing the first interval into a second interval and re-requesting service list transmission approval to the first server at the second interval;
   receiving a second response to the re-request from the first server; and
   determining whether or not to transmit the service list on the basis of the second response.

6. The method according to claim 5, wherein the filtered service data is capable of configuring the service guide if the filtered service data is linked with an accessible service data by each respective digital receiver.

7. The method according to claim 6, wherein at least one of the first service data and the second service data includes at least one of language information, video resolution information, audio/video (AV) type information, viewing rate information and information on a presence or absence of captions, related to a corresponding program.

8. A service system comprising:
   a digital receiver configured to receive a broadcast signal including a content and signaling information for the content from a broadcasting station, generate first service data based on the signaling information, transmit device information to a first server, receive a group identifier (ID) by combining a service name for the first service data and three IDs included in the device information from the first server, transmit a service list including the received group ID and the generated first service data to the first server at a first interval, and request second service data to the first server, wherein the three IDs include an original network ID, a transport stream ID, and a service ID;
   wherein the digital receiver is further configured to receive the second service data based on a search parameter in response to the request from the server and output a service guide based on the received second service data,
   wherein the second service data is configured from mixed first service data which is transmitted from one or more digital receivers and crawled at the first server with additional service data for the first service data transmitted from a second server at the first server, and
   wherein each respective digital receiver is configured to filter out service data, which is inaccessible by each respective digital receiver, among the second service data, store service data except for the filtered service data from the second service data and configure the service guide using the stored service data.

9. The service system according to claim 8, wherein
   the one or more digital receivers are connected with the first server and assigned a same group ID in the service system based on the device information.

10. The service system according to claim 9, wherein the first service data and the second service data include at least one of EPG data, channel browser data and thumbnail image data.

11. The service system according to claim 10, wherein the digital receiver requests service list transmission approval to the first server at the first interval, receives a first response to the request from the first server, and determines whether or not to transmit the service list on the basis of the first response.

12. The service system according to claim 11, wherein when the first response corresponds to transmission approval rejection, the digital receiver changes the first interval into a second interval, re-requests service list transmission approval to the first server at the second interval, receives a second response to the re-request from the first server, and determines whether or not to transmit the service list on the basis of the second response.

13. The service system according to claim 12, wherein the filtered service data is capable of configuring the service guide if the filtered service data is linked with an accessible service data by each respective digital receiver.

14. The service system according to claim 13, wherein at least one of the first service data and the second service data includes at least one of language information, video resolution information, audio/video (AV) type information, viewing rate information and information on a presence or absence of captions, related to a corresponding program.

15. The service system according to claim 14, further comprising:
   the first server configured to group one or more digital receivers on the basis of device information among digital receivers in the service system, transmit a group ID to each digital receiver, and store service lists received from each digital receiver which has a same group ID at a predetermined interval in a database.

\* \* \* \* \*